(12) United States Patent
Imahashi et al.

(10) Patent No.: US 7,831,004 B2
(45) Date of Patent: Nov. 9, 2010

(54) SYNCHRONOUS DETECTING CIRCUIT

(75) Inventors: Naoya Imahashi, Fukuoka (JP);
Masakazu Hoashi, Fukuoka (JP);
Junnei Baba, Fukuoka (JP); Yoshihito Yamamoto, Saitama (JP)

(73) Assignee: Panasonic Corporation, Osaka (JP)

( * ) Notice: Subject to any disclaimer, the term of this patent is extended or adjusted under 35 U.S.C. 154(b) by 704 days.

(21) Appl. No.: 11/761,849

(22) Filed: Jun. 12, 2007

(65) Prior Publication Data

US 2007/0286318 A1    Dec. 13, 2007

(30) Foreign Application Priority Data

| Jun. 13, 2006 | (JP) | 2006-163151 |
| Jun. 13, 2006 | (JP) | 2006-163152 |
| Jul. 5, 2006 | (JP) | 2006-185221 |
| Jul. 28, 2006 | (JP) | 2006-205903 |
| Aug. 2, 2006 | (JP) | 2006-210610 |
| Sep. 12, 2006 | (JP) | 2006-246518 |

(51) Int. Cl.
*H04L 7/00* (2006.01)
(52) U.S. Cl. .................... 375/371; 375/354
(58) Field of Classification Search ............. 375/371, 375/354
See application file for complete search history.

(56) References Cited

U.S. PATENT DOCUMENTS

| 4,218,771 | A | * | 8/1980 | Hogge, Jr. | 375/376 |
| 4,538,283 | A | * | 8/1985 | Hogge, Jr. | 375/232 |
| 4,692,931 | A | * | 9/1987 | Ohsawa | 375/355 |
| 4,821,297 | A | * | 4/1989 | Bergmann et al. | 375/376 |
| 5,764,113 | A | * | 6/1998 | Snell | 332/103 |
| 5,917,850 | A |   | 6/1999 | Fujita et al. | |
| 6,061,778 | A | * | 5/2000 | Sano et al. | 712/35 |
| 6,377,634 | B1 | * | 4/2002 | Yamamoto | 375/324 |
| 6,643,321 | B1 | * | 11/2003 | Genossar et al. | 375/219 |
| 7,010,075 | B2 | * | 3/2006 | Yamada | 375/371 |
| 7,016,449 | B2 | * | 3/2006 | Buchwald et al. | 375/373 |
| 7,155,654 | B2 | * | 12/2006 | Chien et al. | 714/747 |
| 7,403,584 | B2 | * | 7/2008 | Koenenkamp | 375/371 |
| 7,519,138 | B2 | * | 4/2009 | Lee et al. | 375/355 |
| 2002/0065047 | A1 | * | 5/2002 | Moose | 455/63 |
| 2006/0132955 | A1 | * | 6/2006 | Annampedu et al. | 360/49 |

FOREIGN PATENT DOCUMENTS

| JP | 05260106 | 10/1993 |
| JP | 06090262 | 3/1994 |
| JP | 8335892 | 12/1996 |
| JP | 10224416 | 8/1998 |
| JP | 2002280936 | 9/2002 |

* cited by examiner

*Primary Examiner*—Juan A Torres
(74) *Attorney, Agent, or Firm*—Dickinson Wright PLLC

(57) ABSTRACT

In a synchronous detection circuit, an interpolation circuit regulates an interpolation calculation coefficient based on phase shift information when carrying out interpolation calculation processing over a digitally converted received signal. A sampling circuit samples interpolation data using a recovered clock as a reference and two clocks having phases which are advanced and delayed with respect to the recovered clock. A phase shift detecting circuit monitors a phase shift using three sampling data output from the sampling circuit and outputting phase shift information to the interpolation circuit when detecting a predetermined phase shift. A demodulating circuit performs demodulation processing using the data subjected to the sampling with the recovered clock output from the sampling circuit. Where a synchronous shift is detected, the interpolation circuit performs regulation to match a timing having a maximum signal-to-noise ratio and the recovered clock based on the amount of the phase shift.

10 Claims, 33 Drawing Sheets

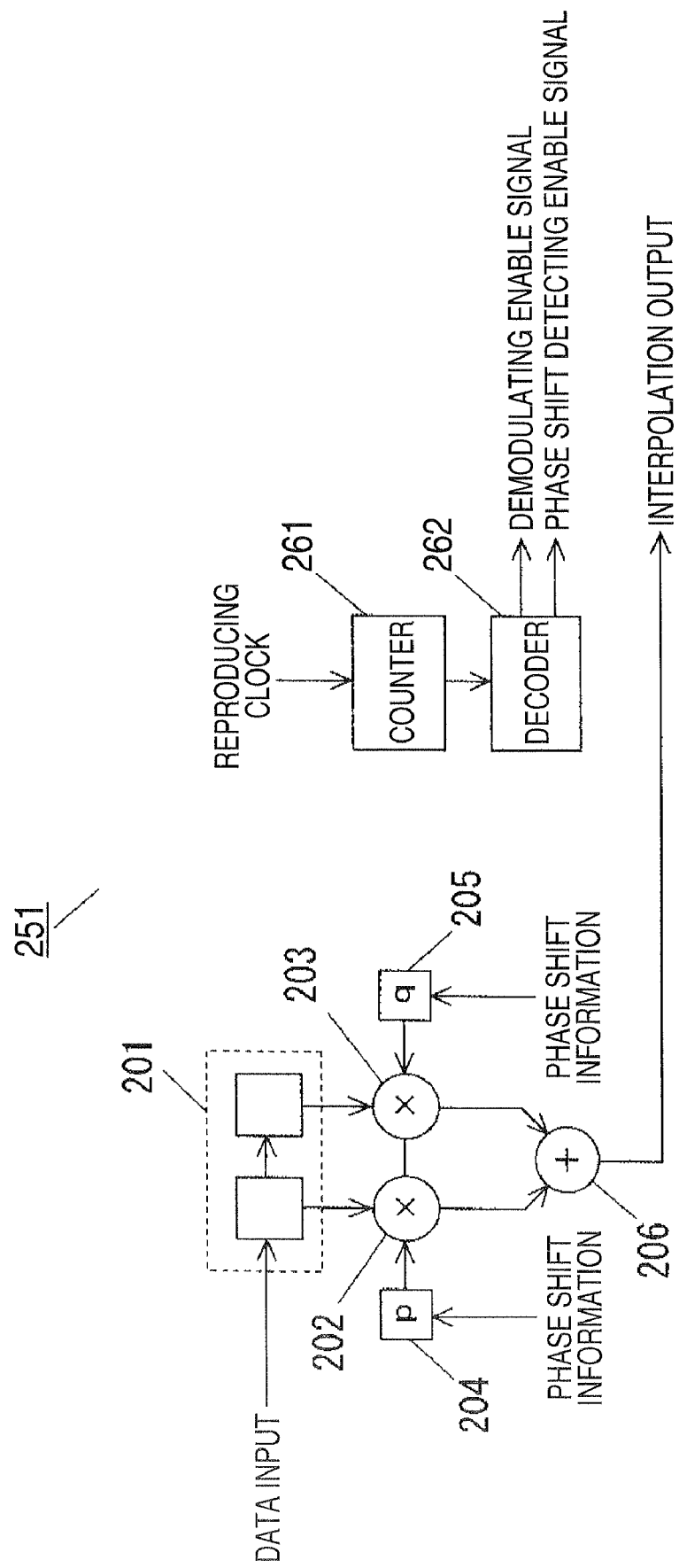

IN CASE OF EXCELLENT WIRELESS COMMUNICATION ENVIRONMENT

IN CASE OF POOR WIRELESS COMMUNICATION ENVIRONMENT

IN CASE OF EXCELLENT WIRELESS
COMMUNICATION ENVIRONMENT

IN CASE OF POOR WIRELESS
COMMUNICATION ENVIRONMENT

SYNCHRONOUS DETECTING CIRCUIT

CROSS-REFERENCE TO RELATED APPLICATIONS

This application is based upon and claims the benefit of priority of Japanese Patent Applications No. 2006-163151 filed on Jun. 13, 2006; No. 2006-163152 filed on Jun. 13, 2006; No. 2006-185221 filed on Jul. 5, 2006; No. 2006-205903 filed on Jul. 28, 2006; No. 2006-210610 filed on Aug. 2, 2006 and No. 2006-246518 filed on Sep. 12, 2006, the contents of which are incorporated herein by reference in its entirety.

FIELD OF THE INVENTION

The present invention relates to a synchronous detection circuit to be used on a receiving side of a communicating apparatus for carrying out a wireless communication, for example, a wireless local area network (LAN).

BACKGROUND

On a receiving side of a communicating apparatus for carrying out a wireless communication, it is necessary to synchronize a received signal in order to demodulate a signal sent from a transmitting side. In the synchronizing operation, there are required two operations, that is, a synchronous capture for starting a demodulating operation in the case in which an expected signal is received and a synchronous follow-up for monitoring a synchronizing shift in the middle of the demodulation to carry out a phase correction at any time, thereby maintaining a synchronization.

In the latter synchronous follow-up operation, there has been known a method of using a clock reproduced in a synchronous capture to generate a clock having a phase advanced or delayed by one clock for the recovered clock and to carry out a phase correction while shifting the recovered clock every clock.

In the method, however, data which can be selected by the recovered clock are any of data output from an analog-to-digital (A/D) converting circuit. Assuming that n-fold oversampling (n is a natural number) is carried out by the A/D converting circuit, therefore, even if a synchronous follow-up circuit carries out the best operation, a time of approximately T/(2n) at a maximum is shifted from an ideal sample timing by setting T to be a symbol cycle or a chip cycle before and after the phase of the recovered clock is shifted in a phase shift circuit, causing a demodulation error.

In the conventional synchronous follow-up circuit, moreover, a phase shift is detected only when a shift of approximately T/(2n) is generated on the recovered clock. For this reason, there is also a drawback that the phase is shifted for a long period of time.

SUMMARY

According to the present invention, a synchronous detection circuit includes: an interpolation circuit for regulating an interpolation calculation coefficient based on phase shift information when carrying out an interpolation calculation processing over a received signal which is digitally converted; a secondary sampling circuit for sampling interpolation data output from the interpolation circuit by using a recovered clock to be a reference and two clocks having phases corresponding to one processing clock which are advanced and delayed for the recovered clock; a phase shift detecting circuit for monitoring a shift of a phase by using three sampling data output from the secondary sampling circuit and outputting phase shift information to the interpolation circuit when detecting a predetermined phase shift; and a demodulating circuit for carrying out a demodulation processing by using the data subjected to the sampling with the recovered clock output from the secondary sampling circuit.

In the case in which a synchronous shift is detected, consequently, the interpolation circuit carries out a regulation in such a manner that a timing having a maximum signal-to-noise (SN) ratio and that of the recovered clock are matched with each other based on the amount of the phase shift obtained from the phase shift detecting circuit. Therefore, it is possible to implement a synchronous follow-up with high precision.

BRIEF DESCRIPTION OF THE DRAWING

FIG. 10 is a diagram showing a structure of an interpolation circuit according to the second embodiment, FIGS. 11($a$) to 11($c$) are charts for explaining a synchronous follow-up operation according to the second embodiment, FIGS. 12($a$) and 12($b$) are charts for explaining the synchronous follow-up operation according to the second embodiment.

DETAILED DESCRIPTION

Each of embodiments according to the invention will be described below. The embodiments can be mutually utilized within a related range.

In the following embodiments, moreover, description will be given by taking, as an example, a wireless LAN communication system using a wireless LAN (IEEE. 802.11) communicating method which is utilized as a wireless network system for transmitting and receiving video data, voice data and data for a computer in a home or a comparatively small-scale office.

Embodiment 1

For a digital wireless communication according to the embodiment, description will be given based on a wireless LAN communication which is normalized as IEEE 802.11.

Figure 1:
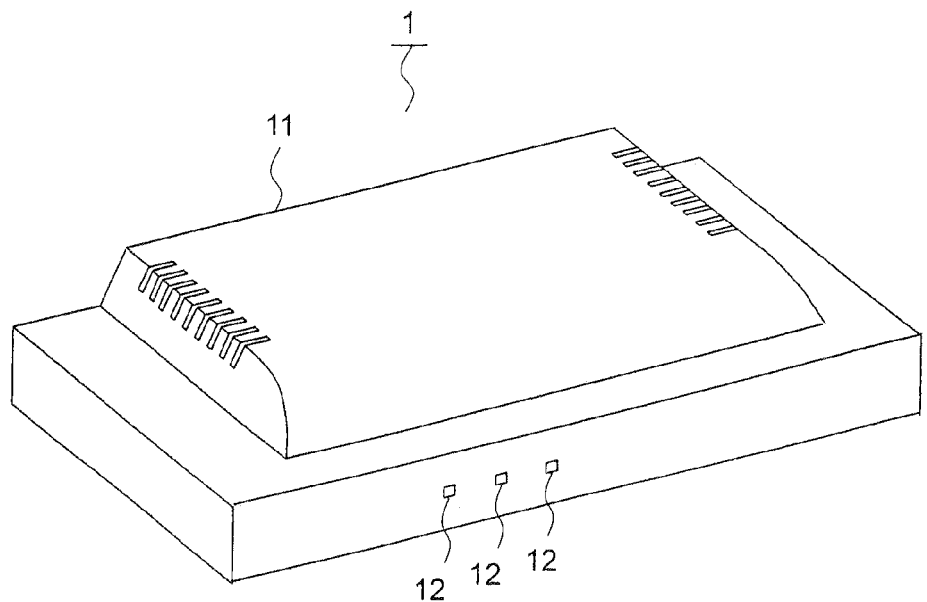
FIG. 1 is a perspective view showing an outer appearance of a front surface of a communicating apparatus.
Figure 2:
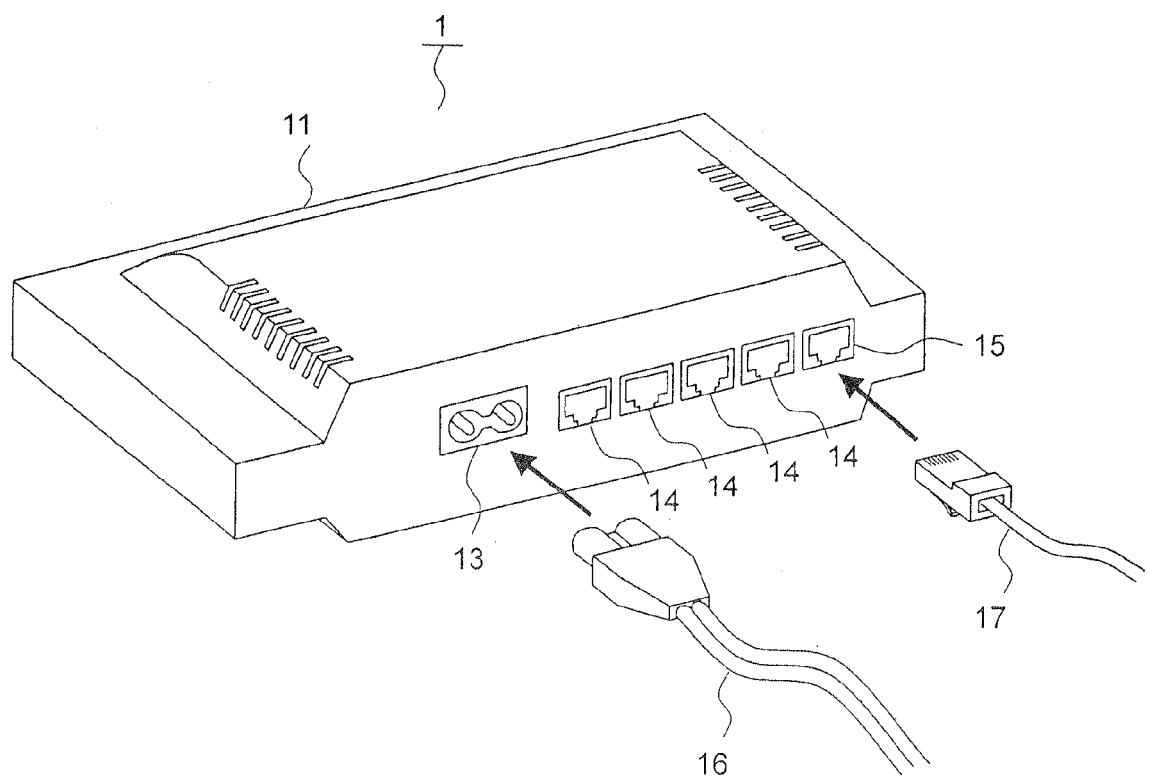
FIG. 2 is a perspective view showing an outer appearance of a back face of the communicating apparatus.

FIG. 1 is a perspective view showing an outer appearance of a front surface of a communicating apparatus and FIG. 2 is a perspective view showing an outer appearance of a back face of the communicating apparatus. A router for relaying a data communication between different communication networks and having a wireless LAN communication function is shown as an example of the communicating apparatus illustrated in FIGS. 1 and 2.

The embodiment relates to an improvement in a synchronous detection as a receiving side function in a digital wireless communication. The communicating apparatus is not restricted to the router but may be an apparatus such as a computer, a telephone, a portable information apparatus or a consumer electronic apparatus which has a digital wireless receiving function (an access point function in a wireless LAN).

In FIG. 1, a communicating apparatus 1 has a housing 11, and a display portion 12 such as an LED (Light Emitting Diode) is provided on a front surface of the housing 11. As shown in FIG. 2, a back face of the housing 11 is provided with a DC (Direct Current) power connector 13, an LAN (Local Area Network) modular jack 14 such as RJ45, and a WAN (Wide Area Network) modular jack 15. A power line 16 such as a parallel cable is connected to the DC power connector 13 as shown in FIG. 2. An LAN cable 17 is connected to the modular jacks 14 and 15.

Figure 3:
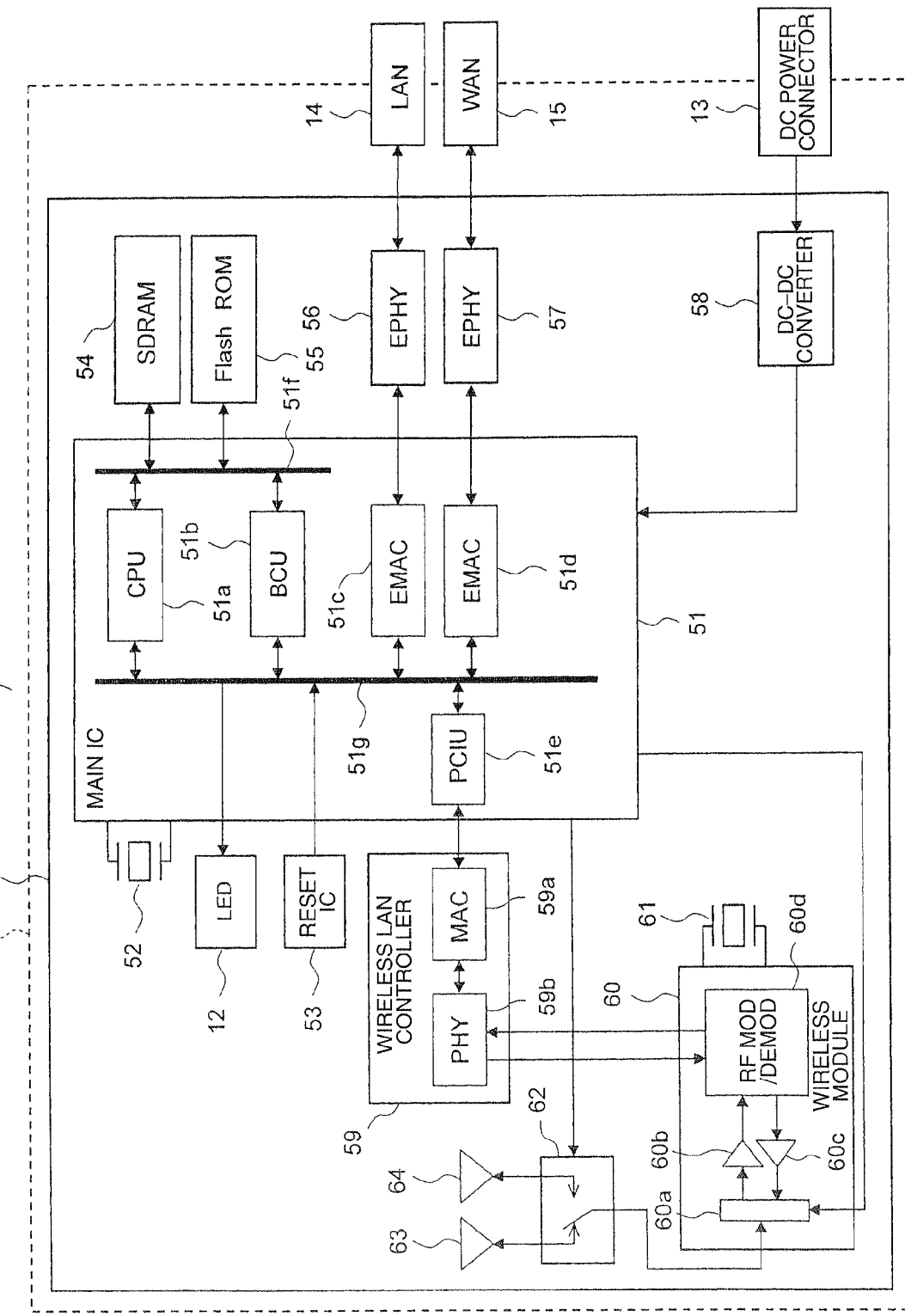
FIG. 3 is a block diagram showing a hardware structure of the communicating apparatus.

FIG. 3 is a block diagram showing a hardware structure of the communicating apparatus.

The communicating apparatus 1 has a circuit module 50 in the housing 11 shown in a broken line as illustrated in FIG. 3.

A main IC (Integrated Circuit) 51, a wireless LAN controller 59 and a wireless module 60 are mounted on the circuit module 50.

The main IC 51 has a CPU (Central Processing Unit) 51a, a bus such as a main bus 51f and a local bus 51g, a BCU (Bus Control Unit) 51b for controlling a data flow on the bus, MAC blocks (EMACs) 51c and 51d for controlling an MAC (Medium Access Control) layer of Ethernet (registered trademark), and a PCIU 51e for controlling a PCI (Peripheral Component Interconnect Unit) bus.

The CPU 51a and the BCU 51b in the main IC 51 are connected to an SDRAM (Synchronous Dynamic Random Access Memory) 54 and a Flash ROM (Flash Read Only Memory) 55 through the main bus 51f. Moreover, the CPU 51a and the BCU 51b are connected to an oscillator 52 for supplying a clock to the main IC 51, the display portion 12 such as an LED and a reset IC 53 for outputting an initializing signal to the main IC 51 through the local bus 51g.

The MAC blocks 51c and 51d in the main IC 51 are connected to PHY (PHYsical layer)•ICs 56 and 57 for controlling a physical layer of Ethernet (registered trademark) respectively, and the PHY•ICs 56 and 57 are connected to the WAN modular jack 14 and the LAN modular jack 15 respectively. Moreover, the main IC 51 is connected to the DC power connector 13 through a DC-DC (Direct Current to Direct Current) converter 58. The DC-DC converter 58 converts a DC voltage supplied from the DC power connector 13 into a DC voltage which is required for the main IC 51.

The wireless LAN controller 59 has an MAC block 59a for controlling an MAC layer and a PHY block 59b for controlling a physical layer. The PCIU 51e in the main IC 51 is connected to the PHY block 59b through the MAC block 59a.

The wireless module 60 has a receiving or transmitting state set through the main IC 51 and includes a transmitting/receiving change-over SW (Switch) 60a, an LNA (Low Noise Amplifier) 60b for amplifying a receiving signal, a PA (Power Amplifier) 60c for amplifying a transmitting signal, and an RF (Radio Frequency) modulator and demodulator 60d for carrying out a modulation into a radio signal and a demodulation from the radio signal.

The wireless module 60 is connected to an oscillator 61 for supplying a clock to the wireless module 60, and the RF modulator and demodulator 60d in the wireless module 60 is connected to the PHY block 59b in the wireless LAN controller 59. The transmitting/receiving change-over SW 60a in the wireless module 60 is connected to antennas 63 and 64 through an antenna change-over SW 62 for changing over an antenna to be used through the main IC 51.

Figure 4:
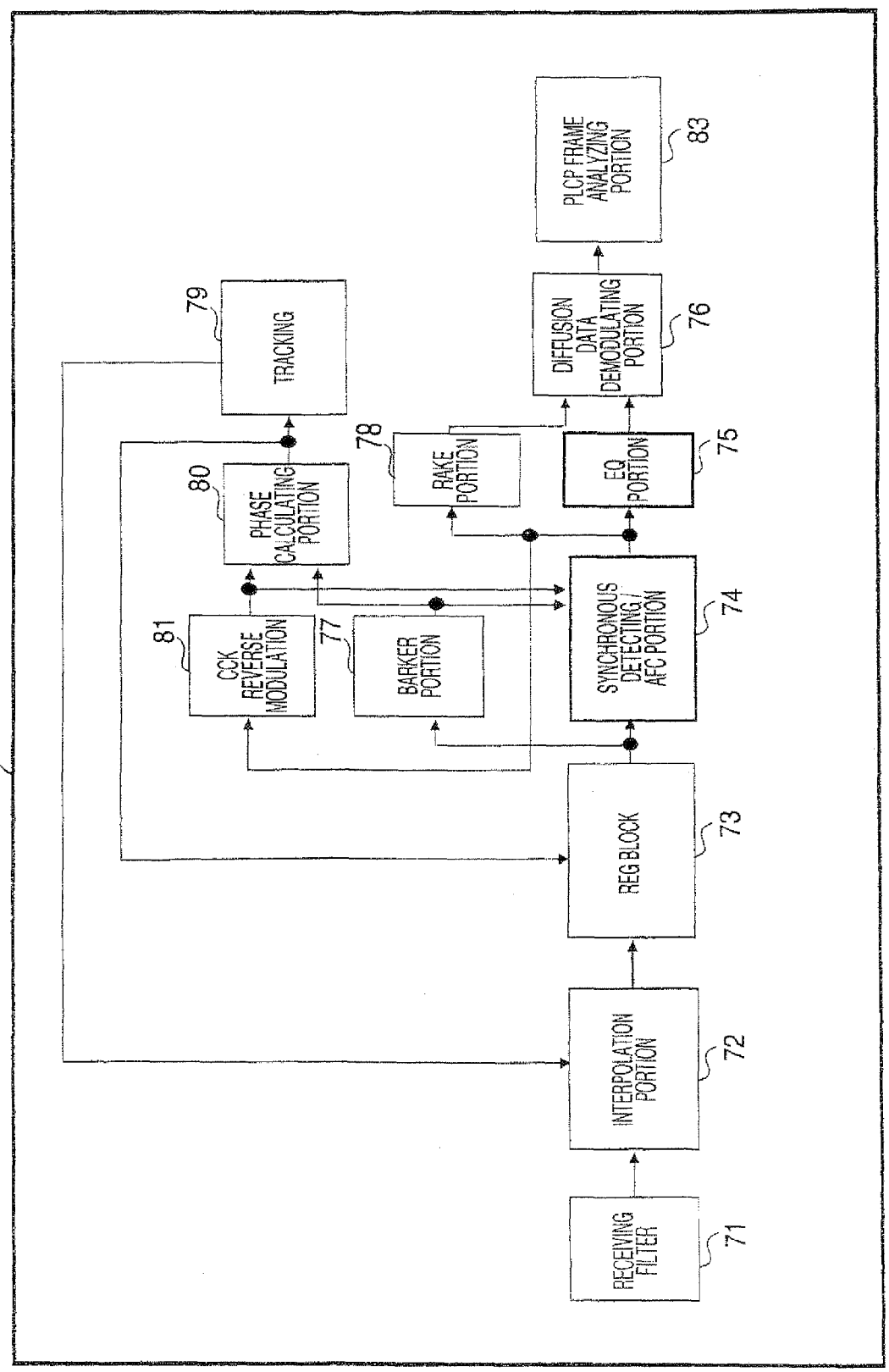
FIG. 4 is a diagram showing a structure of a PHY block.

FIG. 4 is a diagram showing a structure of the PHY block, illustrating the PHY block 59b in FIG. 3.

Analog data received through the antenna 64 are converted into digital data and are input to the PHY block 59b.

In FIG. 4, a necessary band is removed through a receiving filter 71 to reduce the influence of a noise due to an out-of-band component in the PHY block 59b. A signal passing through the receiving filter 71 is input to an interpolation portion 72 to reproduce a peak value of the signal, thereby enhancing SN.

An initial synchronizing signal subjected to a signal feedback processing in the interpolation portion 72 is stored in an REG (register) block 73 and data following the initial synchronization of the signal are reproduced.

In a synchronous detecting/automatic frequency control (AFC) portion 74, a signal following a transmitting signal is reproduced to smoothly carry out an enhancement in a receiving performance and a synchronous reproduction of the signal.

In an EQ (equalizer) portion 75, a signal waveform disturbed by the influence of a multipath or fading is restored and a waveform which is close to the transmitting signal is reproduced. Also in a processing carried out by an RAKE portion 78, as compared with the signal reproduced in the EQ portion 75, a signal in which a closer waveform reproduction to the transmitting signal is obtained is selected in a diffused data demodulating portion 76 to demodulate diffusion data.

Referring to data obtained by demodulating the diffusion data, data on a physical layer are demodulated by a PLCP frame analyzing portion 83 and are transferred to the MAC block 59a.

As a sequence following the initial synchronization of packet data input through the antenna 64, moreover, a preamble portion of the packet data is reproduced in a BARKER portion 77 and information about a rotation of a signal phase is calculated by a phase calculating portion 80.

Referring to a signal subjected to a complementary code keying (CCK) modulation, moreover, in a comparison of a phase with a signal modulated in a CCK reverse modulating portion 81, information about a rotation of a signal phase is calculated.

A clock signal following a phase rotation is reproduced in a tracking portion 79 and a clock subjected to a phase follow-up is transferred to the interpolation portion 72 to be an input portion of the PHY block 59b. Alternatively, the signal is maintained with a clock subjected to the phase follow-up.

Next, description will be given to a synchronous detection processing according to the embodiment.

Figure 5:
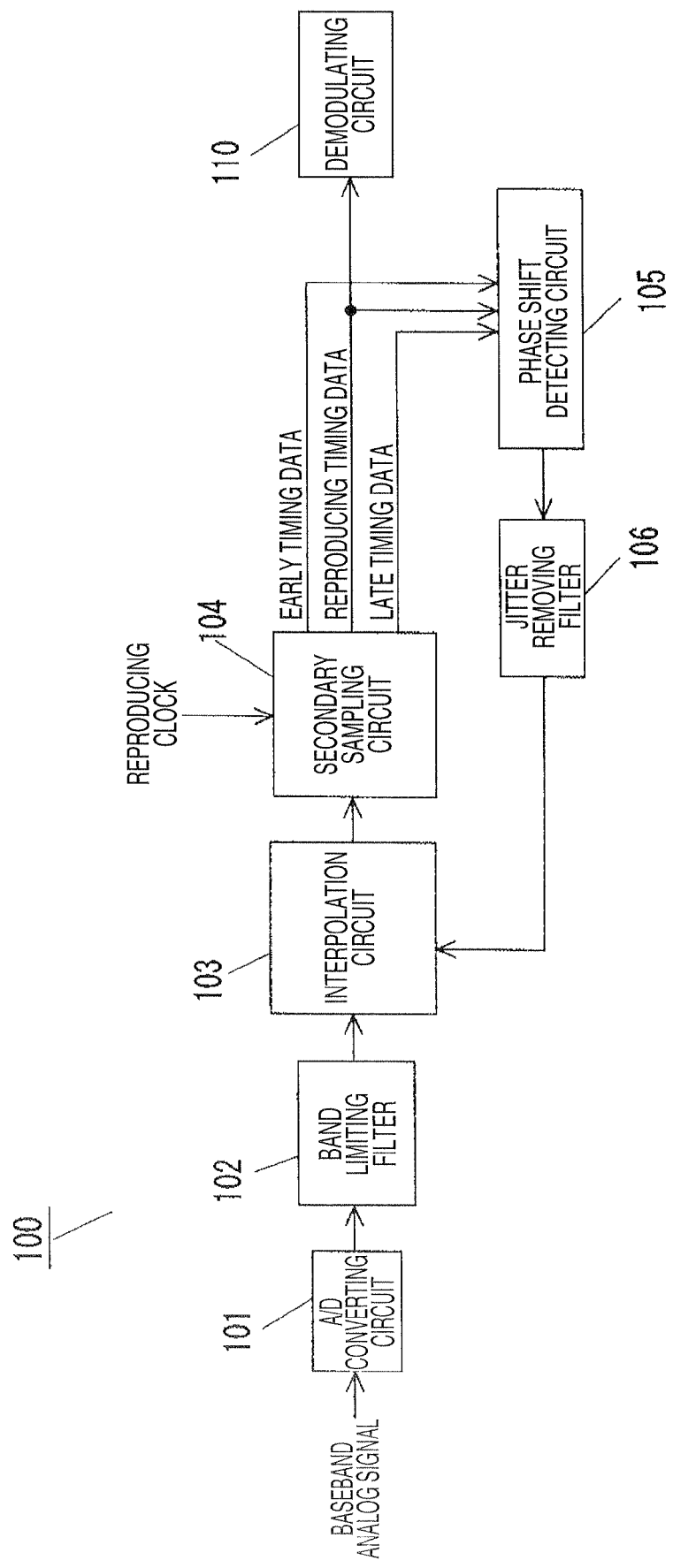
FIG. 5 is a block diagram showing a structure of a synchronous detection circuit according to a first embodiment.

FIG. 5 is a block diagram showing a structure of a synchronous detection circuits according to the first embodiment.

In FIG. 5, a synchronous detection circuit 100 comprises an A/D converting circuit 101, a band limiting filter 102, an interpolation circuit 103, a secondary sampling circuit 104, a phase shift detecting circuit 105, and a jitter removing filter 106. The band limiting filter 102 and the jitter removing filter 106 are provided if necessary.

The A/D converting circuit 101 carries out oversampling of a baseband analog signal and performs a quantization, and outputs the signal thus obtained to the band limiting filter 102.

The band limiting filter 102 carries out a band limitation processing over the sampling data output from the A/D converting circuit 101 and outputs the data thus obtained to the interpolation circuit 103. For example, in the case in which the baseband analog signal is input with an out-of-band noise suppressed sufficiently, the band limiting filter 102 can be omitted.

Figure 6:
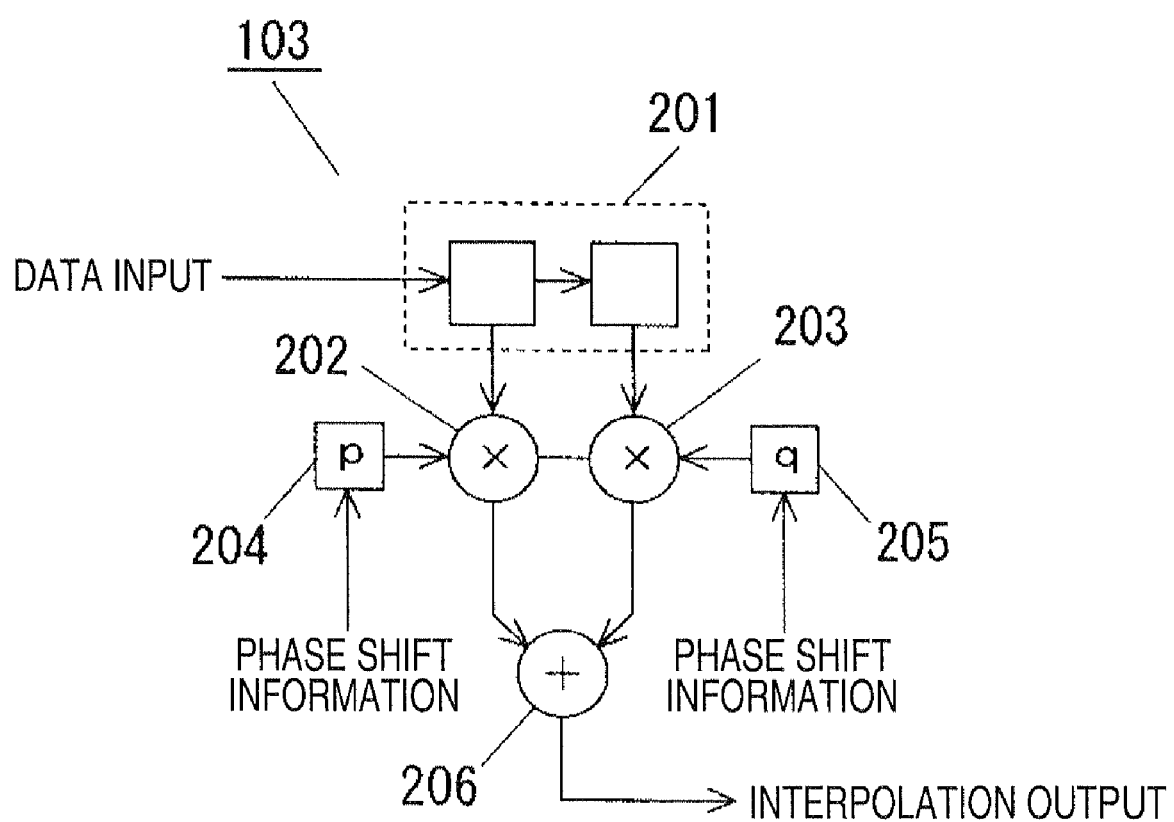
FIG. 6 is a diagram showing a structure of an interpolation circuit according to the first embodiment, FIGS. 7($a$) to 7($c$) are charts for explaining a synchronous follow-up operation according to the first embodiment, FIGS. 8($a$) and 8($b$) are charts for explaining the synchronous follow-up operation according to the first embodiment.

The interpolation circuit 103 carries out an interpolation processing over the sampling data input from the band limiting filter 102 and outputs the data thus obtained to the secondary sampling circuit 104 with the structure shown in FIG. 6, for example. The detailed operation of the interpolation circuit 103 will be described below.

The secondary sampling circuit 104 generates an early clock which is earlier by one clock and a late clock which is later by one clock from a recovered clock in a synchronous capture which is input from an outside (a clock in a demodulation processing) respectively, and uses the three clocks to carry out secondary sampling over the sampling data (interpolation data) subjected to the interpolation processing in the interpolation circuit 103 and thus generates early timing data, reproduction timing data and late timing data and gives them to the phase shift detecting circuit 105.

The phase shift detecting circuit 105 compares amplitudes of three clock timing data input from the secondary sampling circuit 104 to detect a phase shift, and gives, to the jitter removing filter 106, information about the phase shift indicative of the contents of the phase shift which is detected (an amount of the phase shift and a direction of the phase shift).

The jitter removing filter 106 averages the information about the phase shift which is input from the phase shift detecting circuit 105 and removes the influence of a jitter, and outputs the information to the interpolation circuit 103. If a small number of jitter components are contained in the information about the phase shift detection in the phase shift detecting circuit 105 and precision in the detection is sufficient, the jitter removing filter 106 can be omitted.

In the three clock timing data to be output from the secondary sampling circuit 104, the reproduction timing data are input to a demodulating circuit 110 and a data demodulation in a synchronous follow-up is carried out.

A correspondence of FIG. 4 to FIG. 5 will be described.

The A/D converting circuit 101 corresponds to the A/D converting circuit provided in the wireless controller 59 or the wireless module 60.

The band limiting filter 102 corresponds to the receiving filter 71.

The interpolation circuit 103 corresponds to the interpolation portion 72.

The secondary sampling circuit 104, the phase shift detecting circuit 105 and the jitter removing filter 106 mainly correspond to the interpolation portion 72.

The demodulating circuit 110 mainly corresponds to the synchronous detecting/AFC portion 74, the EQ portion 75, the diffusion data demodulating portion 76 and the PLCP frame analyzing portion 83.

FIG. 6 is a block diagram showing a structure of the interpolation circuit according to the first embodiment, illustrating the interpolation circuit 103 in FIG. 5.

As shown in FIG. 6, the interpolation circuit 103 comprises a shift register 201 for shifting sampling data input from the band limiting filter 102 in two stages, a multiplying circuit 202 for setting initial stage output data of the shift register 201 to be one of input data, a multiplying circuit 203 for setting final stage output data of the shift register 201 to be one of input data, an interpolation calculation coefficient generating circuit 204 for generating an interpolation calculation coefficient (a multiplying coefficient p) to be the other input data of the multiplying circuit 202, an interpolation calculation coefficient generating circuit 205 for generating an interpolation calculation coefficient (a multiplying coefficient q) to be the other input data of the multiplying circuit 203, and an adding circuit 206 for adding results of the multiplication of the multiplying circuits 202 and 203 and outputting a value thus obtained as interpolation data to the secondary sampling circuit 104.

The interpolation calculation coefficient generating circuits 204 and 205 generate an interpolation calculation coefficient in a cycle determined in consideration of a relationship between a sampling rate of the A/D converting circuit 101 and a symbol rate (a chip rate in the case of a spectrum diffusion). The cycle is determined in the following manner.

First of all, when a sampling rate of the A/D converting circuit 101 is represented by Ra, a symbol rate (a chip rate in the case of a spectrum diffusion) is represented by Rs and an oversampling number in the execution of the synchronous follow-up processing is represented by n, the interpolation circuit 103 uses Ra data per unit time which are sampled at an equal interval for a baseband analog signal and outputs data as if (n×Ra) data are subjected to the equal interval sampling per unit time for the baseband analog signal.

At this time, a cycle of an interpolation calculation coefficient is given in an inverse number of the greatest common divisor of Ra and (n×Ra). For example, if the sampling rate of the A/D converting circuit 101 is equal to a rate of the oversampling, the cycle of the interpolation calculation coefficient is an inverse number of the sampling rate, that is, a constant value.

For a specific numerical value, for example, in the case in which a sampling rate of the A/D converting circuit 101 is 60 MHz, a chip rate is 11 MHz and an oversampling number is four, the interpolation circuit 103 converts data sampled at 60 MHz into 44 MHz sampling data and outputs the 44 MHz sampling data. At this time, the cycle of the interpolation calculation coefficient is 0.25 μs.

Assuming that the interpolation circuit 103 to be a digital circuit is operated in a clock of 60 MHz, 0.25 μs corresponds to 15 clocks. In this case, the interpolation calculation coefficient generating circuits 204 and 205 prepare and pass 15 interpolation calculation coefficients.

At this time, a ratio of the number of output data to the number of input data per unit time in the interpolation circuit 103 is 15 to 11. Therefore, four of the 15 interpolation calculation coefficients are dummy data. When there are taken measures for generating an enable signal indicating that valid data other than dummy are output, subsequent processings can easily be carried out.

In the case in which phase shift information are input to the interpolation calculation coefficient generating circuits 204 and 205, moreover, such an interpolation calculation coefficient as to shift a phase of an interpolation output is generated at that moment and the interpolation calculation coefficient is subsequently generated cyclically in order to maintain the shifted phase or an order for selecting the interpolation calculation coefficient of the interpolation output is skipped to a proper order at that moment and the interpolation calculation coefficient is subsequently selected sequentially from a skipped part. Description will be given to a detailed operation in the case in which information about the phase shift is input.

An operation of the synchronous detection circuit 100 will be described below.

FIGS. 7 and 8 show a relationship between a baseband analog signal, and a sampling timing of an A/D converting circuit and an interpolation processing.

FIG. 7 is a chart for explaining a synchronous follow-up operation to be carried out in the case in which the phase shift detecting circuit 105 previously detects a phase shift amount exceeding a predetermined phase shift amount as an operation (No. 1) of the synchronous detection circuit 100, and FIG. 8 is a chart for explaining a synchronous follow-up operation to be carried out at any time based on the phase shift amount detected by the phase shift detecting circuit 105 as an operation (No. 2) of the synchronous detection circuit 100.

In FIGS. 7 and 8, a, b, c and d shown in an axis of abscissas represent a sample timing in the case in which the A/D converting circuit 101 carries out fourfold oversampling. A, B, C and D shown on a waveform of a baseband analog signal 120 indicate sampling data to be output by the A/D converting circuit 101 in corresponding sample timings of a, b, c and d.

FIGS. 7(a), 7(b) and 7(c) and FIGS. 8(a) and 8(b) show various relationships between a maximum amplitude timing of the baseband analog signal 120 and the sampling timings a, b, c and d in the A/D converting circuit 101.

In the interpolation circuit 103, in FIG. 6, the sampling data A, B, C and D are input to the shift register 201 in this order. If a multiplying coefficient p is 0 and a multiplying coefficient q is 1, a result of the multiplication of the multiplying circuit 203 is 0 and a result of the multiplication of the multiplying circuit 204 is A, B, C and D.

Figure 7A:
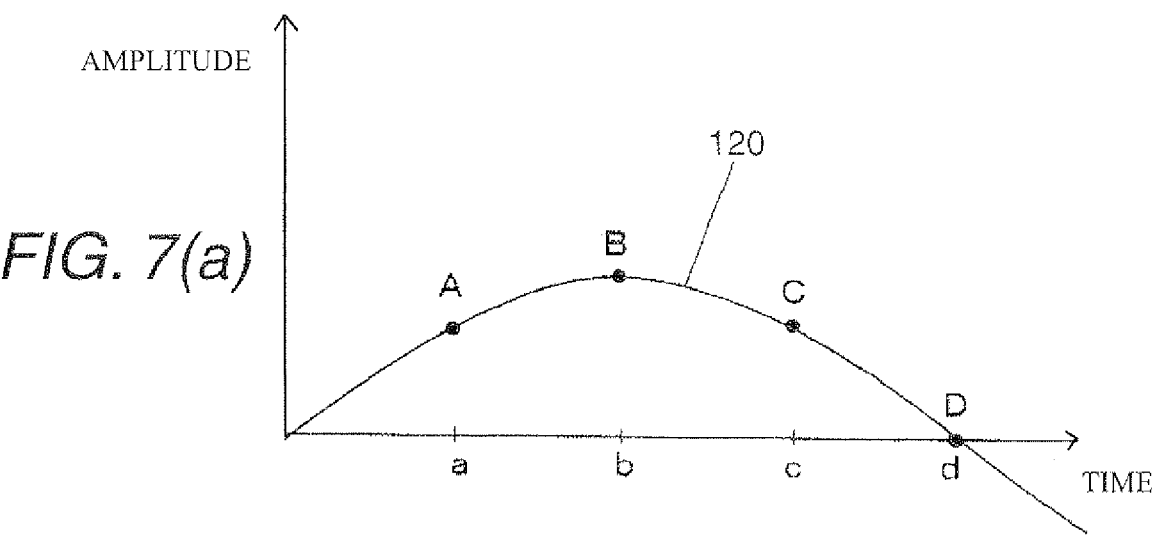

In FIG. 7, it is assumed that a timing indicative of a maximum value of the baseband analog signal 120 is coincident with a timing for giving a maximum SN ratio. With a relationship shown in FIG. 7(a) in which the timing is coincident with the sample timing b of the A/D converting circuit 101, if an interpolation calculation coefficient (p, q) is equal to (0, 1), the interpolation data A, B, C and D output from the interpolation circuit 103 are data themselves which are subjected to the sampling in the sample timings a, b, c and d.

In the secondary sampling circuit 104, a relationship of B>A=C is detected based on a comparison among the amplitudes of the interpolation output data A, B and C and phase shift information of B>A=C is given to the interpolation circuit 103 via the jitter removing filter 106 in the example.

Since the interpolation circuit 103 receives the phase shift information in a normal sample timing, the interpolation calculation coefficient of (p, q)=(0, 1) is maintained. In the demodulating circuit 110, consequently, it is possible to fetch a maximum value B of the baseband analog signal 120. Consequently, the demodulation can be carried out in an excellent SN ratio.

Figure 7B:
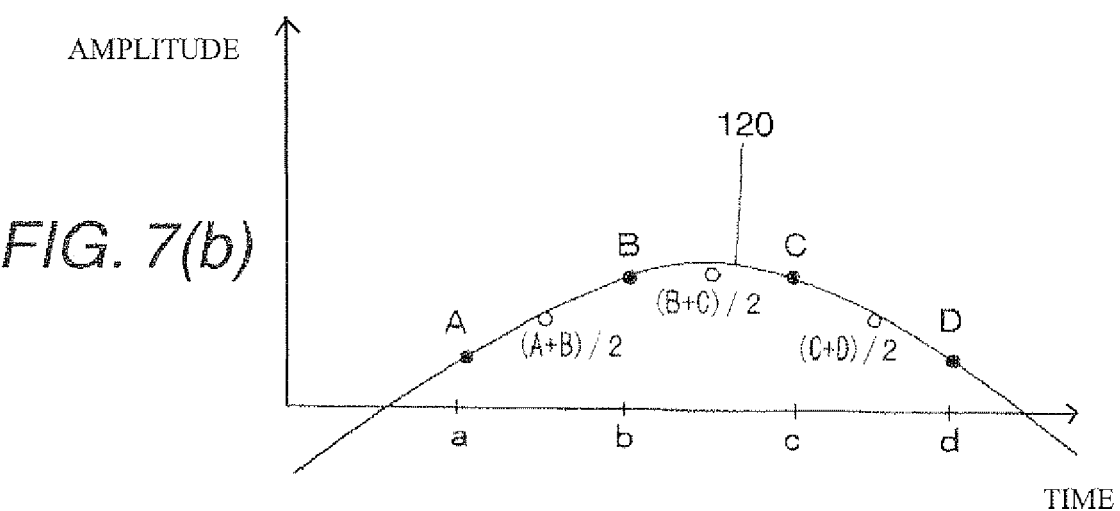

It is assumed that a relationship between a maximum value of the baseband analog signal 120 and the sample timing b is gradually started to be shifted according to a slight shift of a master clock frequency between a transmitter and a receiver so that a state shown in FIG. 7(b) is brought as time passes in the above state.

FIG. 7(b) shows the case in which the maximum value of the baseband analog signal 120 is positioned on a center of the sample timings b and c, and the amplitudes of the interpolation output data B and C are equal to each other. As compared with the interpolation output data B having a maximum amplitude in FIG. 7(a), both of the interpolation output data B and C in FIG. 7(b) have the sample timings shifted from each other. Therefore, the SN ratio is reduced.

With a further passage of time, when the maximum value of the baseband analog signal 120 passes through the central position of the sample timings b and c and approaches the sample timing c most slightly, the amplitude of the interpolation output data C is greater than that of the interpolation output data B.

At this time, phase shift information giving a notice that the timing data in the sample timing c have the greatest amplitude is output from the phase shift detecting circuit 105. The phase shift information is input to the interpolation circuit 103 via the jitter removing filter 106.

Since the interpolation circuit 103 receives the phase shift information giving a notice that late timing data have the greatest amplitude, the interpolation calculation coefficient is changed. For example, (p, q)=(0, 1) is changed into (p, q)=(0.5, 0.5). As a result, interpolation output data to be (A+B)/2, (B+C)/2 and (C+D)/2 are generated and output to the secondary sampling circuit 104 as shown in FIG. 7(b) from the input sampling data A, B, C and D in the interpolation circuit 103. Consequently, the demodulating circuit 110 can fetch the interpolation output data (B+C)/2 subjected to secondary sampling through a recovered clock.

As shown in FIG. 7(b), since the interpolation output data (B+C)/2 are created as data in a timing having the highest SN ratio of the baseband analog signal 120 through an interpolation calculation, the SN ratio is the highest. In the demodulating circuit 110, therefore, it is possible to carry out a demodulation in an excellent SN ratio also in the case in which a phase shift is generated.

Figure 7C:
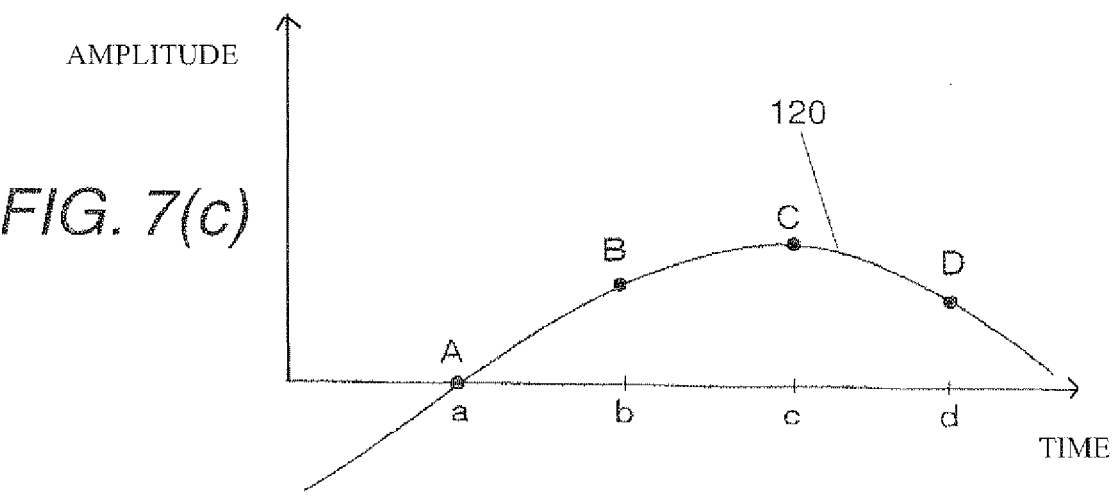

In the case in which the maximum value of the baseband analog signal 120 is coincident with the position of the sample timing c soon and the time further passes as shown in FIG. 7(c), then, the interpolation calculation coefficient is maintained to be (p, q)=(0.5, 0.5). Therefore, the phase shift detecting circuit 105 receives interpolation output data (A+B)/2 subjected to the secondary sampling in the early clock, the interpolation output data (B+C)/2 subjected to the secondary sampling in the recovered clock, and the interpolation output data (C+D)/2 subjected to the secondary sampling in the late clock.

In this case, the interpolation output data (C+D)/2 have the greatest amplitude. Therefore, the phase shift detecting circuit 105 outputs the phase shift information giving a notice that the late timing data have the greatest amplitude to the interpolation circuit 103 via the jitter removing filter 106.

The interpolation circuit 103 sets the interpolation calculation coefficient to be (p, q)=(0, 1) again in order to change the late timing data into the timing data in the recovered clock. Consequently, the interpolation output data A, B, C and D are output.

At this time, the interpolation circuit 103 regulates the timing in order to output the data C in the recovered clock timing. Thus, the demodulating circuit 110 can fetch a maximum value C of the baseband analog signal 120 and can carry out the demodulation in an excellent SN ratio.

In the case in which a synchronous shift from the timing having a maximum SN ratio is generated, thus, the interpolation calculation coefficient is changed to create the data in the timing having the maximum SN ratio, thereby carrying out the demodulation. Therefore, the demodulating operation can be stably carried out in an excellent SN ratio so that a receiving sensitivity can be enhanced.

With reference to FIG. 8, description will be given to the case in which the phase shift detecting circuit 105 gives phase shift information to the interpolation circuit 103 via the jitter removing filter 106 at any time to carry out a synchronous follow-up operation when a synchronous phase is shifted most slightly.

Figure 8A:
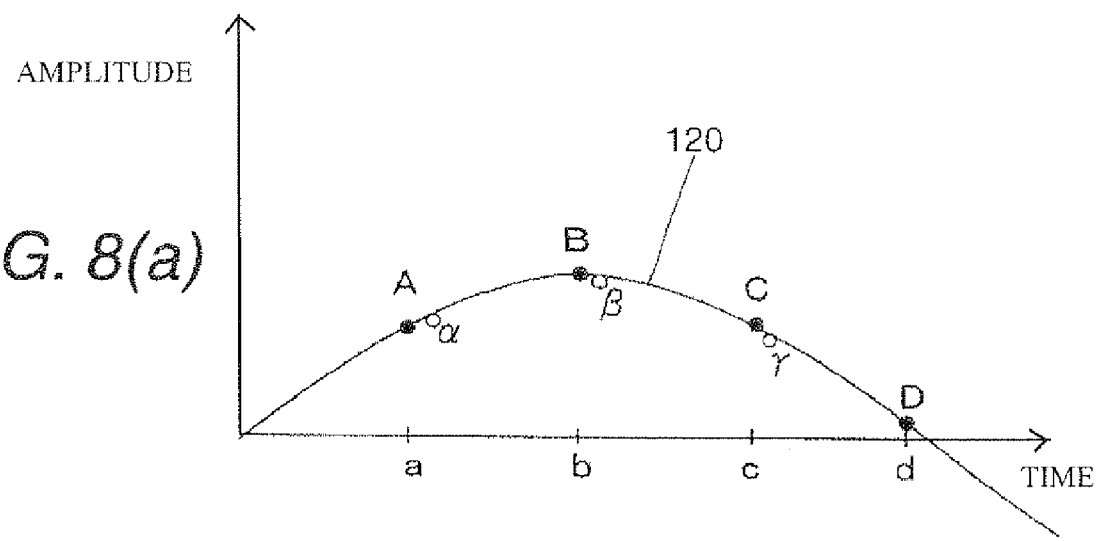
Figure 8B:
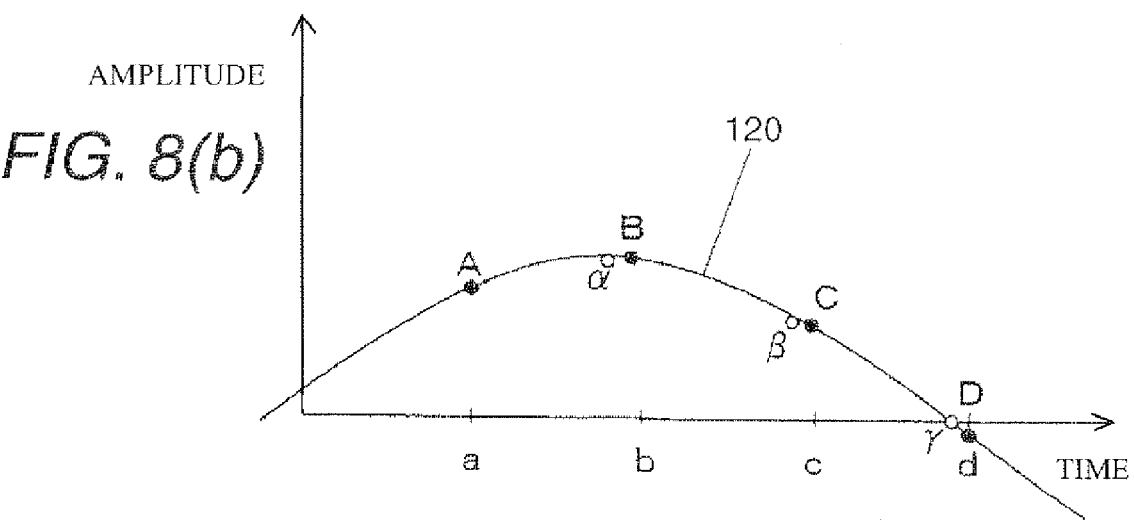

FIGS. 8(a) and 8(b) show a state in which a phase is slightly shifted from the state illustrated in FIG. 7(a). FIG. 8(a) shows the case in which the sampling data C have a slightly greater amplitude than the sampling data A, and FIG. 8(b) shows the case in which the sampling data C have a slightly smaller amplitude than the sampling data A.

As described above, in the state shown in FIG. 7(a), the phase shift detecting circuit 105 recognizes that a sample timing which is currently used in the demodulation is the sample timing b. In the interpolation circuit 103, the interpolation calculation coefficient (p, q) is set to be (p, q)=(0, 1). Therefore, the interpolation data A, B, C and D output from the interpolation circuit 103 are data themselves which are subjected to the sampling in the sampling timings a, b, c and d.

The phase shift detecting circuit 105 compares the amplitudes of the three timing data which are transferred from the secondary sampling circuit 104, generates phase shift information indicative of an increase in any of the data and gives the phase shift information to the interpolation circuit 103 through the jitter removing filter 106.

The interpolation circuit 103 changes values of the interpolation calculation coefficients p and q corresponding to the phase shift information which are input.

More specifically, in the case shown in FIG. 8(a), the interpolation circuit 103 inputs the phase shift information indicating that the amplitude of the sampling data C is slightly greater than that of the sampling data A. Therefore, the interpolation calculation coefficient p is set to be a slightly greater value than zero and the interpolation calculation coefficient q is set to be a slightly smaller value than one. For example, (p, q)=(0.125, 0.875) is set.

As a result, the output of the interpolation circuit 103 is α, β, γ, . . . shown in FIG. 8(a). A timing position of the interpolation data β is placed on a vicinal phase advance side of the sample timing b of the sampling data B, and is a timing position in which an actual maximum value of the baseband analog signal 120 is given. The interpolation circuit 103 regulates the timing to carry out the sampling over the interpolation data β in the recovered clock, thereby outputting the interpolation data.

In the case shown in FIG. 8(b), moreover, the interpolation circuit 103 inputs phase shift information indicating that the sampling data A have a slightly greater amplitude than the sampling data C. Therefore, the interpolation calculation coefficient p is set to be a slightly smaller value than one and the interpolation calculation coefficient q is set to be a slightly greater value than zero.

For example, (p, q)=(0.875, 0.125) is set. As a result, the output of the interpolation circuit 103 is α, β, γ . . . shown in FIG. 8(b). A timing position of the interpolation data α is placed on a vicinal phase delay side of the sample timing b of the sampling data B, and is a timing position in which an actual maximum value of the baseband analog signal 120 is given. The interpolation circuit 103 regulates the timing to carry out the sampling over the interpolation data α in the recovered clock, thereby outputting the interpolation data.

In the case in which the phase shift is detected at any time to execute the interpolation processing, thus, it is possible to follow the phase shift with a further shorter time delay than that described with reference to FIG. 7. Therefore, it is possible to carry out a synchronous follow-up with higher precision.

Embodiment 2

A structure of a communicating apparatus according to a second embodiment is the same as that shown in FIGS. 1 to 4 according to the first embodiment.

Figure 9:
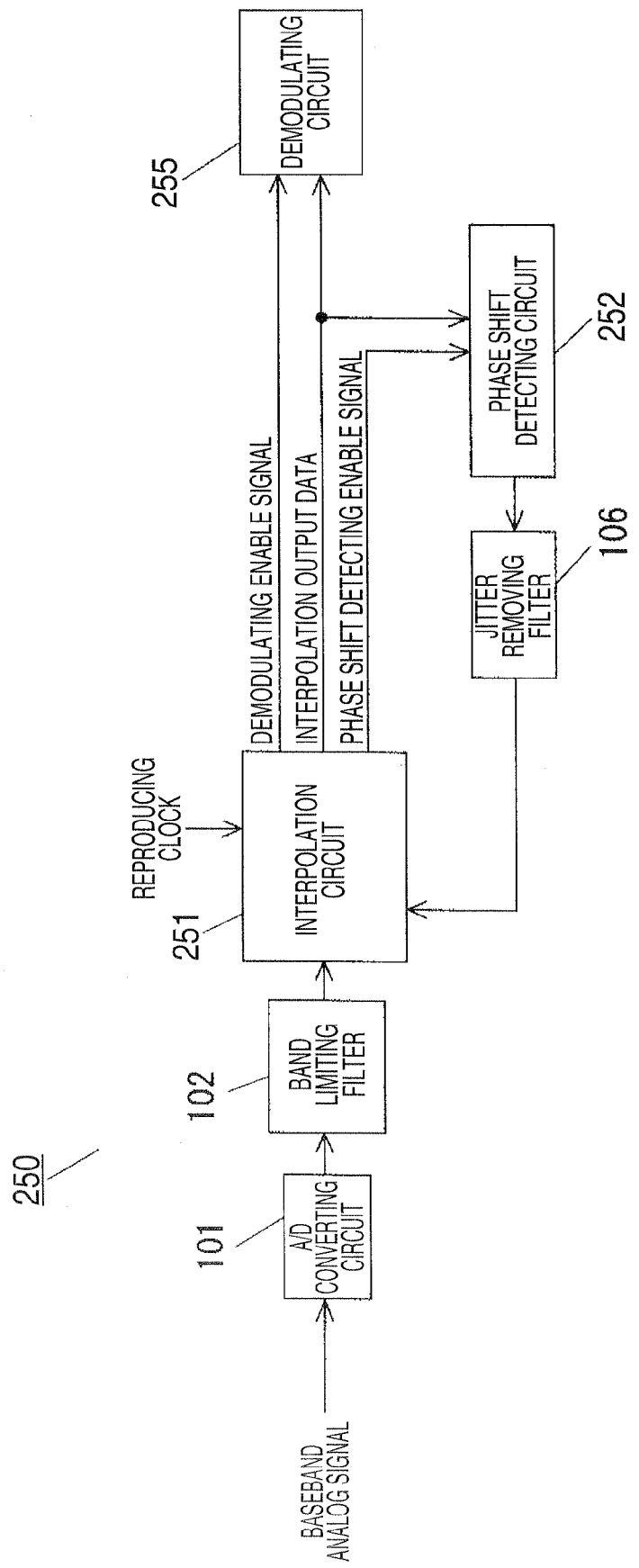
FIG. 9 is a block diagram showing a structure of a synchronous detection circuit according to a second embodiment.

FIG. 9 is a block diagram showing a structure of a synchronous detection circuit according to the second embodiment. In FIG. 9, identical or equivalent components to the components shown in FIG. 5 have the same reference numerals. Portions related to the second embodiment will be mainly described.

As shown in FIG. 9, in a synchronous detection circuit 250 according to the second embodiment, an interpolation circuit 251 is provided in place of the interpolation circuit 103 and the secondary sampling circuit 104, and a phase shift detecting circuit 252 is provided in place of the phase shift detecting circuit 105 in the structure shown in FIG. 5. Moreover, a demodulating circuit 255 is provided in place of the demodulating circuit 110.

The interpolation circuit 251 has a structure shown in FIG. 10. Sampling data input from a band limiting filter 102 are subjected to an interpolation processing. In that case, when a control signal (phase shift information) is input from a jitter removing filter 106, an interpolation calculation coefficient (a multiplying coefficient) is changed to carry out the interpolation processing. A signal thus obtained is output as interpolation data, and furthermore, a demodulating enable signal and a phase shift detecting enable signal are generated from a recovered clock in a synchronous capture which is input from an outside and are output.

The phase shift detecting circuit 252 detects a phase shift by a comparison of amplitudes of the respective interpolation data output from the interpolation circuit 251 for an enable period indicated by a phase shift detecting enable signal output from the interpolation circuit 251, and furthermore, detects a timing in which a maximum amplitude is present and gives phase shift information indicative of the contents of the detected phase shift (an amount of the phase shift and a direction of the phase shift) and maximum amplitude timing information to the interpolation circuit 251 via the jitter removing filter 106.

The demodulating enable signal and the interpolation output data which are output from the interpolation circuit 251 are input to the demodulating circuit 255 so that a data demodulation in a synchronous follow-up is carried out.

FIG. 10 is a block diagram showing a structure of the interpolation circuit, illustrating the interpolation circuit 251 in FIG. 9.

As shown in FIG. 10, in the interpolation circuit 251, a counter 261 and a decoder 262 are added to the interpolation circuit 103 in FIG. 6. In other words, the interpolation circuit 251 is constituted by interpolation calculating portions (201 to 206) and enable signal generating portions (261 and 262).

The counter 261 repetitively counts one cycle of the recovered clock in the synchronous capture which is input from the outside and gives the count value to the decoder 262.

The decoder 262 decodes the count value sent from the counter 261 to output an enable signal directed to the phase shift detecting circuit 105 in which a 3-sample timing period in an A/D converting circuit 101 is set to be an enable period (a phase shift detecting enable signal) and an enable signal directed to the demodulating circuit 255 which indicates a middle timing of the 3-sample timing period in the A/D converting circuit 101 (a demodulating enable signal).

An operation of the synchronous detection circuit 250 will be described below.

FIG. 11 is a chart for explaining a synchronous follow-up operation to be carried out by applying an interpolation processing in the case in which the phase shift detecting circuit 252 detects a phase shift amount which exceeds a predetermined phase shift amount as an operation (No. 1) of the synchronous detection circuit 250.

Moreover, FIG. 12 is a chart for explaining a synchronous follow-up operation to be carried out by applying the interpolation processing at any time based on the phase shift amount detected by the phase shift detecting circuit 252 as an operation (No. 2) of the synchronous detection circuit 250.

FIGS. 11 and 12 correspond to FIGS. 7 and 8 according to the first embodiment respectively, illustrating a relationship between a maximum value to be phase synchronized in a baseband analog signal 120 and a sample timing of the A/D converting circuit 101 and a relationship between the phase shift and the interpolation processing.

For convenience of explanation, FIG. 11 has the same expression as that in FIG. 7 and FIG. 12 has the same expression as that in FIG. 8. In the interpolation circuit 251, the interpolation calculating portions (201 to 206) are the same as the interpolation circuit 103. Portions related to the second embodiment will be mainly described.

Figure 11A:
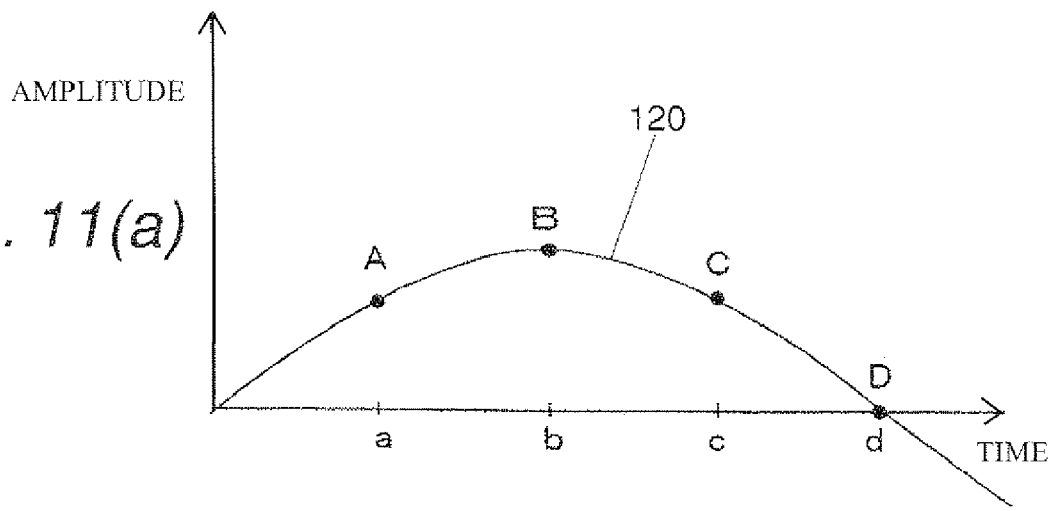

First of all, in FIG. 11, the phase shift detecting circuit 252 fetches interpolation output data by setting a period of the sample timings a to c to be an enable period with a relationship shown in FIG. 11(a) in which a maximum value of the baseband analog signal 120 is coincident with the sample timing b of the A/D converting circuit 101.

In the interpolation calculating portions (201 to 206) of the interpolation circuit 251, in the same manner as in the first embodiment, interpolation data A, B, C and D are output as (p, q)=(0, 1), for example.

In the phase shift detecting circuit 252, a relationship of B>A=C is detected based on a comparison of the amplitudes of the interpolation output data A, B and C, and it is decided that the amplitude of the data is the greatest in a middle timing which is currently demodulated, that is, a synchronous shift is not generated and a notice that the synchronous shift is not generated on the interpolation circuit 251 is given via the jitter removing filter 106.

In the interpolation calculating portions (201 to 206), accordingly, the interpolation calculation coefficient of (p, q)=(0, 1) is maintained. In the demodulating circuit 255, consequently, the maximum value B of the baseband analog signal 120 can be fetched. Therefore, the demodulation can be carried out in an excellent SN ratio.

Figure 11B:
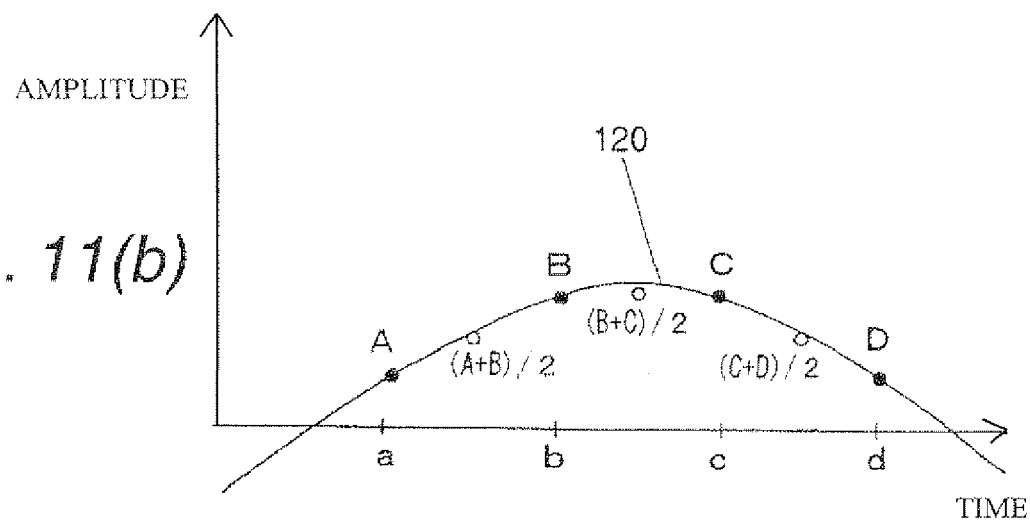

Next, description will be given to the case in which a relationship between the maximum value of the baseband analog signal 120 and the sample timing b is gradually started to be shifted due to a slight shift in a master clock frequency between a transmitter and a receiver and a state shown in FIG. 11(b) is brought.

FIG. 11(b) shows the case in which the maximum value of the baseband analog signal 120 is positioned on a center of the sample timings b and c and the amplitudes of the interpolation output data B and C are equal to each other. Since both of the interpolation output data B and C in FIG. 11(b) have timings shifted from the maximum value of the baseband analog signal 120, both of them have low SN ratios.

When the maximum value of the baseband analog signal 120 passes through a central position between the sample timings b and c and approximates to the sample timing c most slightly with further passage of time, the amplitude of the interpolation output data C is greater than that of the interpolation output data B.

At this time, the phase shift detecting circuit 252 outputs phase shift information for giving a notice that timing data (late timing data) in the sample timing c have the greatest amplitude. The phase shift information passes through the jitter removing filter 106 and is then input to the interpolation circuit 251.

The interpolation circuit 251 receives the phase shift information for giving the notice that the late timing data have the greatest amplitude. Therefore, the interpolation calculation coefficient is changed.

For example, (p, q)=(0, 1) is changed into (p, q)=(0.5, 0.5). As a result, in the interpolation circuit 251, interpolation output data of (A+B)/2, (B+C)/2 and (C+D)/2 are generated from the input sampling data A, B, C and D and are output as shown in FIG. 11(b).

At this time, a timing for outputting the interpolation output data (B+C)/2 is adapted to a timing for outputting a demodulating enable signal. Thus, the demodulating circuit 255 can fetch the interpolation output data (B+C)/2.

As shown in FIG. 11(b), the interpolation output data (B+C)/2 are created as data in such a timing that the SN ratio of the baseband analog signal 120 is the highest by the interpolation calculation. Therefore, the data have the highest SN ratio. Also in the case in which a phase shift is generated, accordingly, the demodulating circuit 255 can carry out the demodulation in an excellent SN ratio.

Figure 11C:
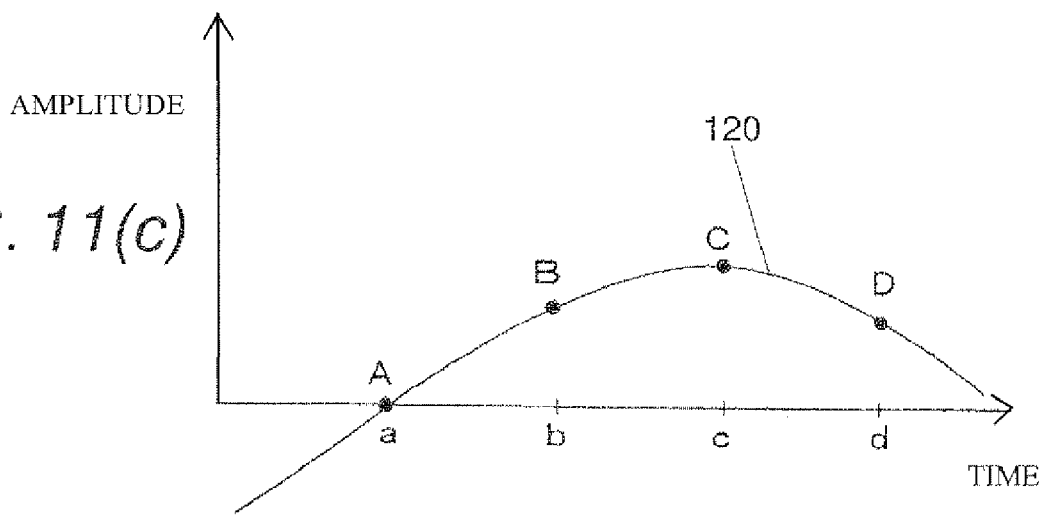

In the case in which the maximum value of the baseband analog signal 300 is coincident with the position of the sample timing c soon and the time further passes as shown in FIG. 11(c), then, the phase shift detecting circuit 252 receives the interpolation output data to be (A+B)/2, (B+C)/2 and (C+D)/2 in response to the phase shift detecting enable signal because the interpolation calculation coefficient is maintained to be (p, q)=(0.5, 0.5) in the interpolation circuit 251.

In this case, the interpolation output data (C+D)/2 have the greatest amplitude. Therefore, the phase shift detecting circuit 252 outputs phase shift information for giving a notice that data fetched in a last timing for the phase shift detecting enable signal period have the greatest amplitude to the interpolation circuit 251 via the jitter removing filter 106.

The interpolation circuit 251 sets the interpolation calculation coefficient of (p, q)=(0, 1) again in order to change the data in the last timing for the phase shift detecting enable signal period into data in a middle timing for the phase shift detecting enable signal period.

Consequently, the interpolation output data A, B, C and D are output. At this time, the interpolation circuit 251 carries out a timing regulation in order to output the data C in a timing of the demodulating enable signal. Consequently, the demodulating circuit 255 can fetch the maximum value C of the baseband analog signal 120. Therefore, the demodulation can be carried out in an excellent SN ratio.

In the case in which a synchronous shift from the timing having the highest SN ratio is detected, thus, the interpolation calculation coefficient is changed to create the data in the timing having the highest SN ratio, thereby carrying out the demodulation. Consequently, the demodulating operation can be stably carried out in an excellent SN ratio and a receiving sensitivity can be enhanced.

With reference to FIG. 12, next, description will be given to the case in which phase shift information detected at any time by the phase shift detecting circuit 252 is given to the interpolation circuit 251 via the jitter removing filter 106 to carry out the synchronous follow-up operation when a synchronous phase is slightly shifted.

Figure 12A:
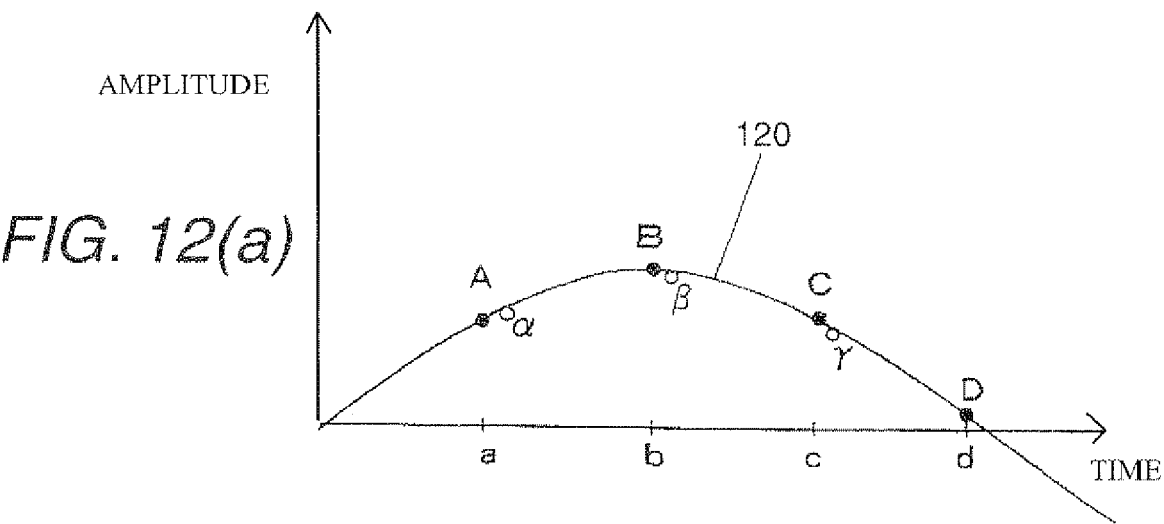
Figure 12B:
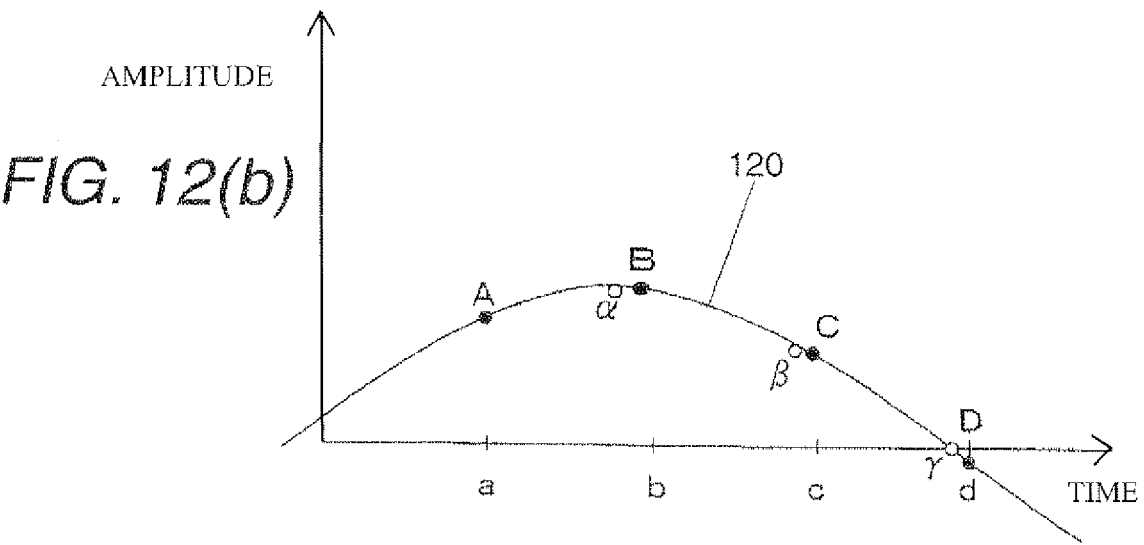

FIGS. 12(a) and 12(b) show a state in which a phase is slightly shifted from the state illustrated in FIG. 11(a). FIGS. 12(a) and 12(b) show the case in which the amplitude of the sampling data C is slightly greater than that of the sampling data A, and FIG. 12(b) shows the case in which the amplitude of the sampling data C is slightly smaller than that of the sampling data A.

As described above, in the state shown in FIG. 11(a), the phase shift detecting circuit 252 recognizes that the sample timing which is currently used for a demodulation is the sample timing b. In the interpolation circuit 251, the interpolation calculation coefficient is set to be (p, q)=(0, 1). Therefore, the interpolation data A, B, C and D output by the interpolation circuit 501 are data themselves which are sampled in the sample timings a, b, c and d.

The phase shift detecting circuit 252 compares the amplitudes of the interpolation data fetched for the period of the phase shift detecting enable signal and generates phase shift information indicative of an increase in any data, and gives the same phase shift information to the interpolation circuit 251 via the jitter removing filter 106.

The interpolation circuit 251 changes the values of the interpolation calculation coefficients p and q corresponding to the phase shift information which is input.

More specifically, in the case shown in FIG. 12(a), phase shift information indicating that the amplitude of the sampling data C is slightly greater than that of the sampling data A is input in the interpolation circuit 251. Therefore, the interpolation calculation coefficient p is set to be a value which is slightly greater than zero and the interpolation calculation coefficient q is set to be a value which is slightly smaller than one. For example, (p, q)=(0.125, 0.875) is set.

As a result, the output of the interpolation circuit 251 is α, β, γ . . . shown in FIG. 8(a). A timing position of the interpolation data P is placed on a vicinal phase advance side of the sample timing b of the sampling data B, and is a timing position for giving an actual maximum value of the analog baseband signal. The interpolation circuit 251 regulates a timing in order to carry out sampling over the interpolation data β with a recovered clock, thereby outputting the interpolation data.

In the case shown in FIG. 12(b), moreover, phase shift information indicating that the amplitude of the sampling data A is slightly greater than that of the sampling data C is input in the interpolation circuit 251. Therefore, the interpolation calculation coefficient p is set to be a value which is slightly smaller than one and the interpolation calculation coefficient q is set to be a value which is slightly greater than zero.

For example, (p, q)=(0.875, 0.125) is set. As a result, the output of the interpolation circuit 251 is α, β, γ . . . shown in FIG. 12(b). A timing position of the interpolation data α is placed on a vicinal phase delay side of the sample timing b of the sampling data B, and is a timing position for giving an actual maximum value of the baseband analog signal 120. The interpolation circuit 251 regulates a timing in order to carry out sampling over the interpolation data α with a recovered clock, thereby outputting the interpolation data.

In the case in which the phase shift is detected at any time to execute the interpolation processing, thus, it is possible to follow the phase shift with a shorter time delay than that described with reference to FIG. 11. Therefore, it is possible to carry out a synchronous follow-up with higher precision.

Embodiment 3

A structure of a communicating apparatus according to a third embodiment is the same as shown in FIGS. 1 to 4 according to the first embodiment.

Figure 13:
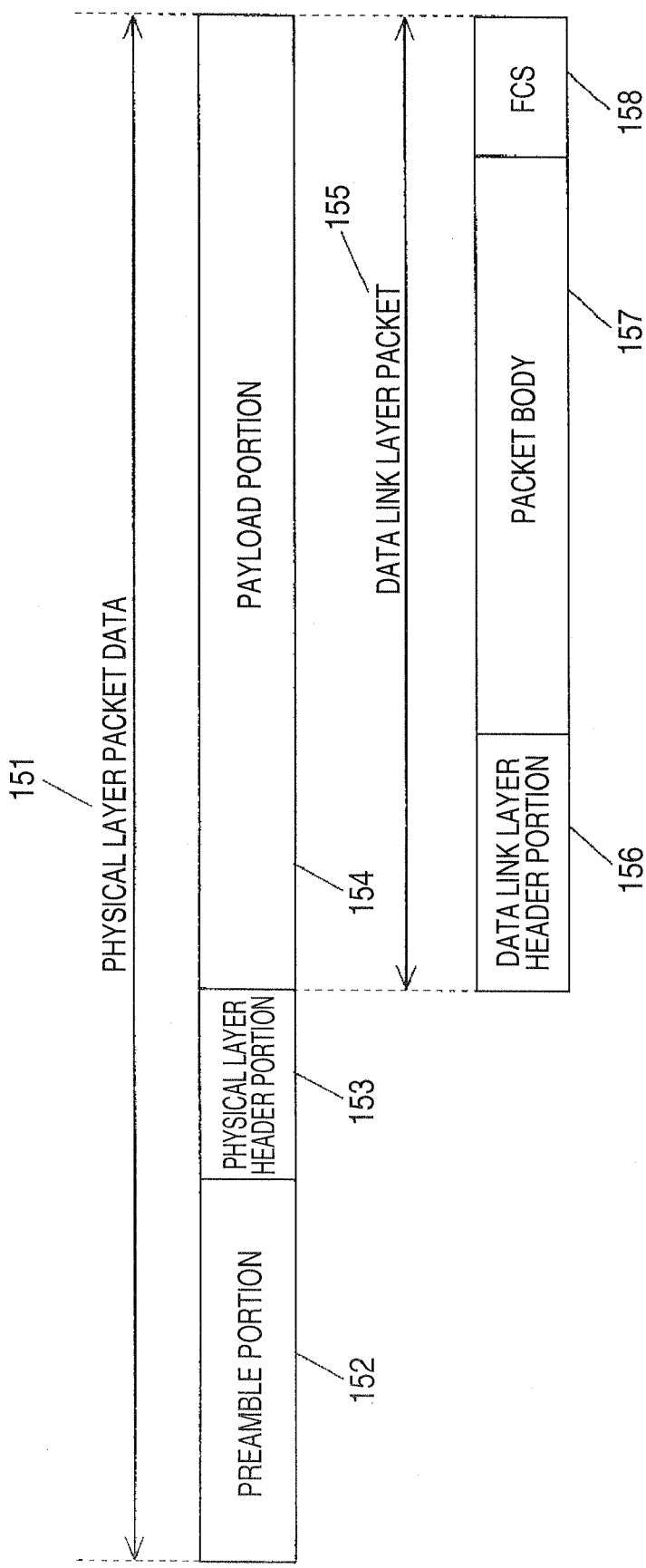
FIG. 13 is a diagram for explaining physical layer packet data in a wireless LAN.

FIG. 13 is a diagram for explaining physical layer packet data in a wireless LAN.

In general, a wireless communication is carried out by setting, as a lump, physical layer packet data 151 constituted in FIG. 11.

With the packet structure shown in FIG. 13, the physical layer packet data 151 to be one lump are constituted by a preamble portion 152 for regulating a timing synchronization of a receipt, a physical layer header portion 153 to be control information such as a transmitting destination address of a packet, and a payload portion 154 to be actual physical layer data.

Moreover, the payload portion 154 to be the physical layer data is constituted by a data link layer packet 155, that is, a data link layer header portion 156 to be control information, a packet body 157 to be user data which are transmitted, and an FCS (Frame Check Sequence) 158 for inspecting an error of the packet.

A device on a transmitting side carries out a digital modulation and a radio frequency modulation for a wireless communication over the physical layer packet data 151, and transmits the same data as a radio wave onto a space with a radio carrier frequency.

A device on a receiving side receives a signal based on a radio wave generated by the device on the transmitting side through an antenna, demodulates a signal subjected to a wireless modulation and carries out a digital demodulation, thereby demodulating the physical layer packet data 151. By reproducing receive data from the physical layer packet data 151, it is possible to implement a wireless communication.

In the wireless communication, reference frequencies to be used in a transmission and a receipt are not perfectly coincident with each other. As a function of absorbing a shift of a frequency and that of a phase, an AFC (Automatic Frequency Control) to be a signal processing of the receipt and a signal detecting method are used.

In the wireless communication to be carried out over a space, moreover, it is supposed that a frequency and phase characteristic is deteriorated by the influence of a multipath or fading over a transmission path, and furthermore, various deteriorations in a signal, for example, a deterioration in a signal due to an interference of the same frequency are caused every moment. By the influence, similarly, a change in the frequency and the phase appears on the receiving side, and furthermore, a detecting error in the receipt is made. Accordingly, it is important to employ means for absorbing a shift of the reference frequencies and phases of the transmission and the receipt and eliminating a shift of a frequency and a phase which is caused by a deterioration in a signal due to an external environment, thereby maintaining a receiving performance.

An operation of the device on the receiving side according to the third embodiment will be described below.

Figure 14:
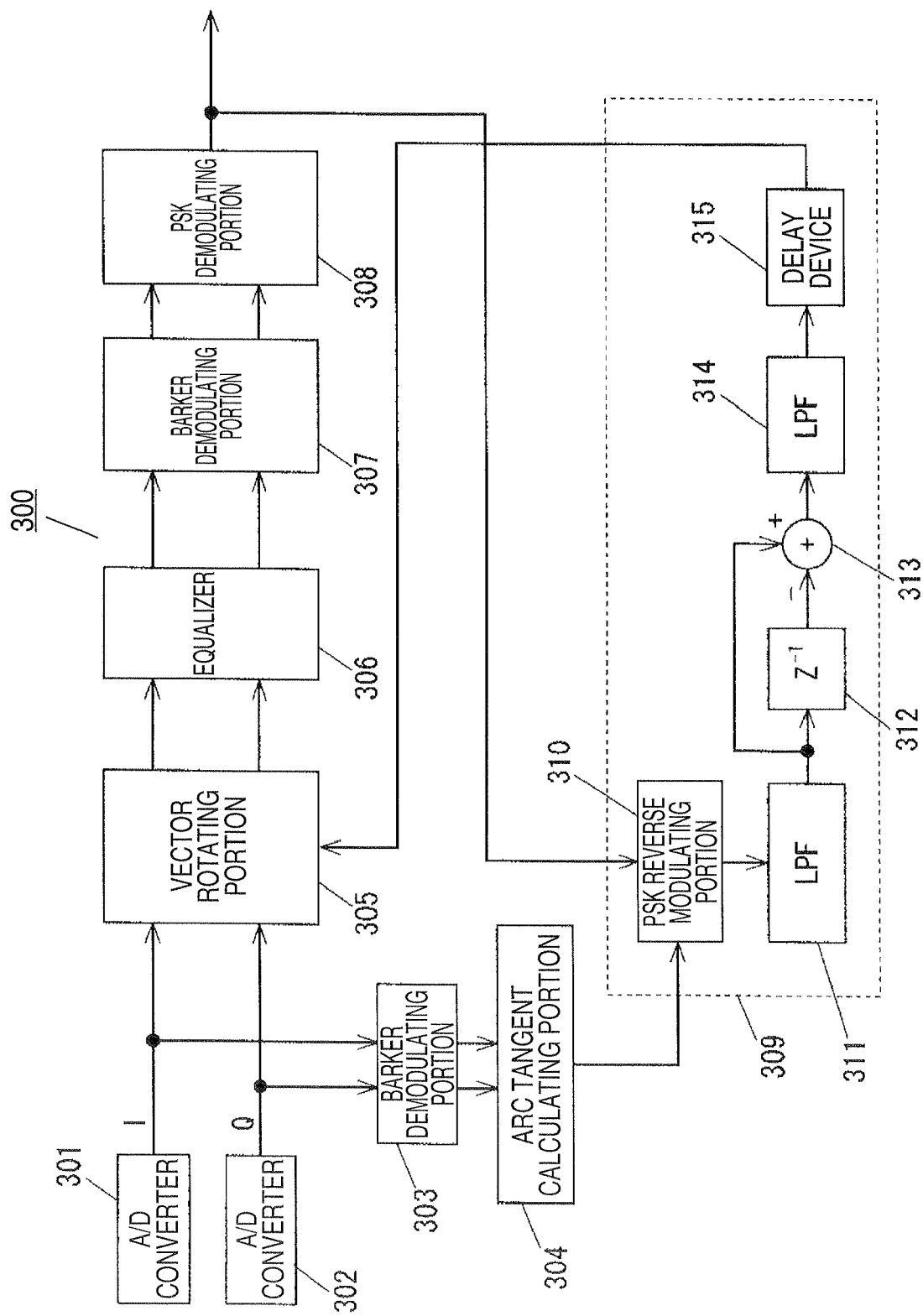
FIG. 14 is a block diagram showing a structure of a synchronous detecting device according to a third embodiment.

FIG. 14 is a diagram showing a structure of a synchronous detecting device according to the embodiment, illustrating a synchronous detecting device 300.

In FIG. 14, A/D converters 301 and 302 serve to convert received signals subjected to a wireless demodulation into digital signals of I (an in-phase channel) and Q (an orthogonal channel), respectively.

A Barker demodulating portion 303 serves to carry out a demodulation based on a demodulation of a Barker correlation signal.

An arc tangent calculating portion 304 serves to extract a phase component of the received signal which is demodulated in the Barker demodulating portion 303.

A vector rotating portion 305 serves to rotate a phase of the received signal following a frequency error and a phase shift of a transmitting signal.

An equalizer 306 serves to carry out waveform shaping over the received signal as a processing of eliminating a waveform interference in a wireless section.

A Barker demodulating portion 307 serves to carry out a demodulation based on a demodulation of the Barker correlation signal for the signal subjected to the waveform shaping.

A PSK demodulating portion 308 serves to carry out a PSK (Phase Shift Keying) demodulation over the signal demodulated by the Barker demodulating portion 307.

A PSK reverse modulating portion 310 serves to input an angle signal calculated by the arc tangent calculating portion 304 and a phase signal of a former symbol of the received signal which is demodulated by the PSK demodulating portion 308, and to extract a frequency offset and a phase error between the transmission and the receipt from the phase signal extracted in the ark tangent calculating portion 304.

An LPF (Low Pass Filter) 311 serves to eliminate a high frequency component from the signal and to extract an absolute phase.

A 1-symbol delay device 312 serves to delay an output signal of the LPF 311 by one symbol.

A subtracter 313 serves to subtract the signal of the 1-symbol delay device 312 from the output signal of the LPF 311.

The delay device 315 serves to delay, by a predetermined time, the signal of the LPF 314 for eliminating a noise component of the signal of the subtracter 313.

A synchronous detecting/AFC processing portion 309 is constituted by the PSK reverse modulating portion 310, the LPF 311, the 1-symbol delay device 312, the subtracter 312, the LPF 314 and the delay device 315.

Description will be given to a correspondence of FIGS. 4 and 14.

The Barker demodulating portion 303, the arc tangent calculating portion 304, the vector rotating portion 305 and the synchronous detecting/AFC processing portion 309 correspond to the synchronous detecting/AFC portion 74.

The equalizer 306 mainly corresponds to the EQ portion 75. The Barker demodulating portion 307 mainly corresponds to the diffusion data demodulating portion 76. The PSK demodulating portion 308 mainly corresponds to the PLCP frame analyzing portion 83.

An operation of the synchronous detection circuit 300 according to the third embodiment will be described below.

In FIG. 14, the received signal which is subjected to a wireless demodulation and is converted into a baseband is converted into I (in-phase channel) and Q (orthogonal channel) digital signals by the A/D converters 301 and 302. Based on decoding of a Barker correlation signal to be one of diffusion codes to be used as the wireless communication on the basis of the I and Q signals, the Barker signal is decoded by the Barker demodulating portion 303.

Figure 15:
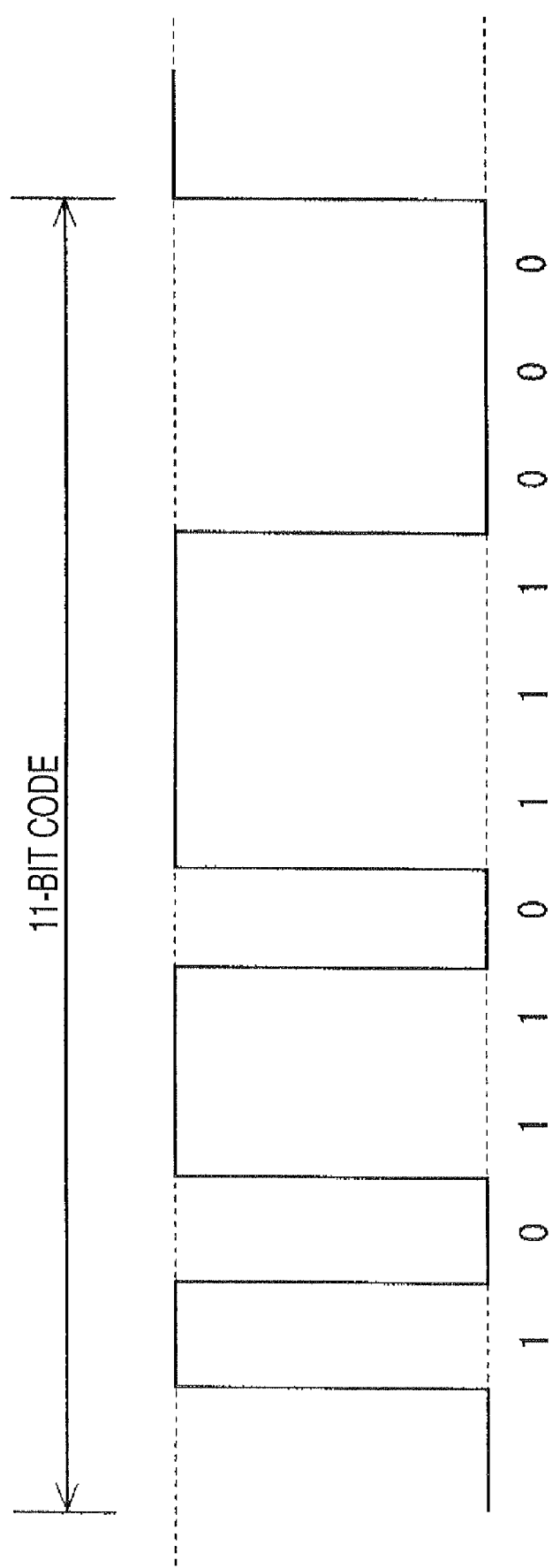
FIG. 15 is a diagram showing a code pattern of a Barker code according to the third embodiment, FIGS. 16($a$) and 16($b$) are charts showing an autocorrelation characteristic according to the third embodiment.

Description will be given to a Barker code to be one of correlation codes which are used in a wireless LAN system. FIG. 15 is a diagram showing a code pattern of a Barker code.

In FIG. 15, the Barker code has a code length of 11 bits having a fixed pattern of 11 chips and carries out encoding and decoding for one symbol in an identical data pattern for a transmission and a receipt by using the code length.

Figure 16A:
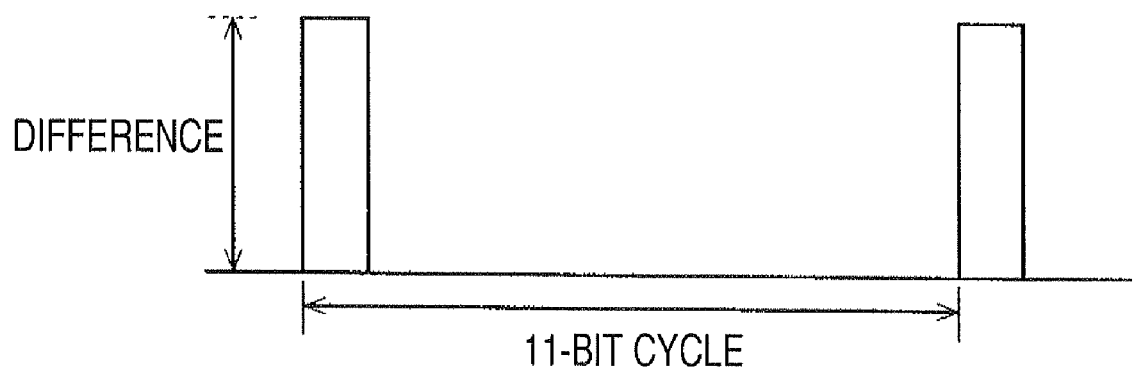
Figure 16B:
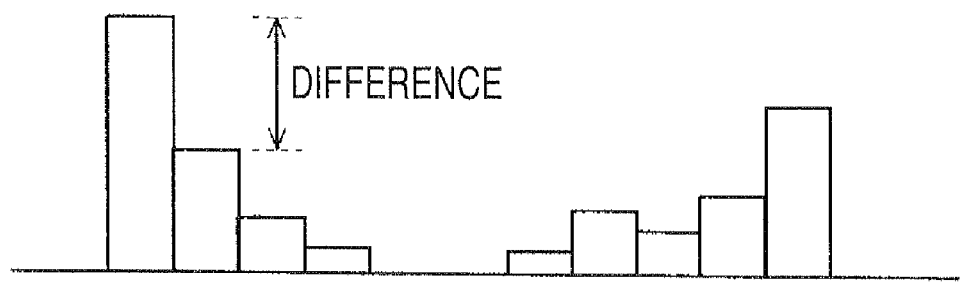

On the receiving side, the demodulation is carried out in an identical data pattern to that on the transmitting side. As a result, an autocorrelation signal shown in FIG. 16 is brought so that symbol data are reproduced. More specifically, FIG. 16(*a*) shows the case in which a wireless communication environment is excellent, and the autocorrelation signal is decoded into the same waveform as that of transmit data. FIG. 16(*b*) shows the case in which the wireless communication environment is poor. Even if a noise made by a disturbance other than an original waveform of the transmit data is mixed, the original waveform having the noise suppressed is demodulated into the autocorrelation signal.

By extracting a change in the frequencies and phases of the transmission and receipt based on a signal having a high autocorrelation characteristic, it is possible to detect the frequency and the phase through a signal from which the influence of the disturbance such as fading or a multipath generated in a wireless environment is eliminated.

Returning to FIG. 14, a phase component of the received signal from which the influence of the disturbance is eliminated by the Barker demodulating portion 303 is extracted by the arc tangent calculating portion 304. Based on the phase component, a frequency and a phase error between the transmission and the receipt are extracted by the synchronous detecting/AFC processing portion 309 to carry out a receiving detection.

As a specific processing, an angle signal calculated by the arc tangent calculating portion 304 and a phase signal of a former symbol which is demodulated by the PSK demodulating portion 308 in the received signal are input to the PSK reverse modulating portion 310, and a modulated phase of the former symbol is subtracted from the phase signal extracted from the arc tangent calculating portion 304 so that a PSK modulating component is removed and a frequency offset and a phase error between the transmission and the receipt are extracted. Based on the signal, an absolute phase is extracted in the LPF 311. A signal passing through the 1-symbol delay device 312 is subtracted from a current signal by the subtracter 313 so that the influence of a frequency offset between symbols is eliminated and a noise component is removed by the LPF 314 again. Consequently, a frequency error between the transmission and the receipt is extracted accurately. As a processing of timing the signal, the timing is carried out by the delay device 315.

Based on the phase signal extracted by a serial synchronous detecting/AFC processing portion 309, a phase is rotated to follow a frequency error and a phase shift of a transmitting signal every symbol in the vector rotating portion 305, thereby carrying out a conversion into a received signal following a transmitting frequency.

As a processing of eliminating a waveform interference in a wireless section, waveform shaping is carried out over the data by the equalizer 306, and the diffused signal is demodulated by the Barker demodulating portion 307. By demodulating a signal obtained by a digital modulation through the PSK demodulating portion 308, the data are reproduced.

Figure 17:
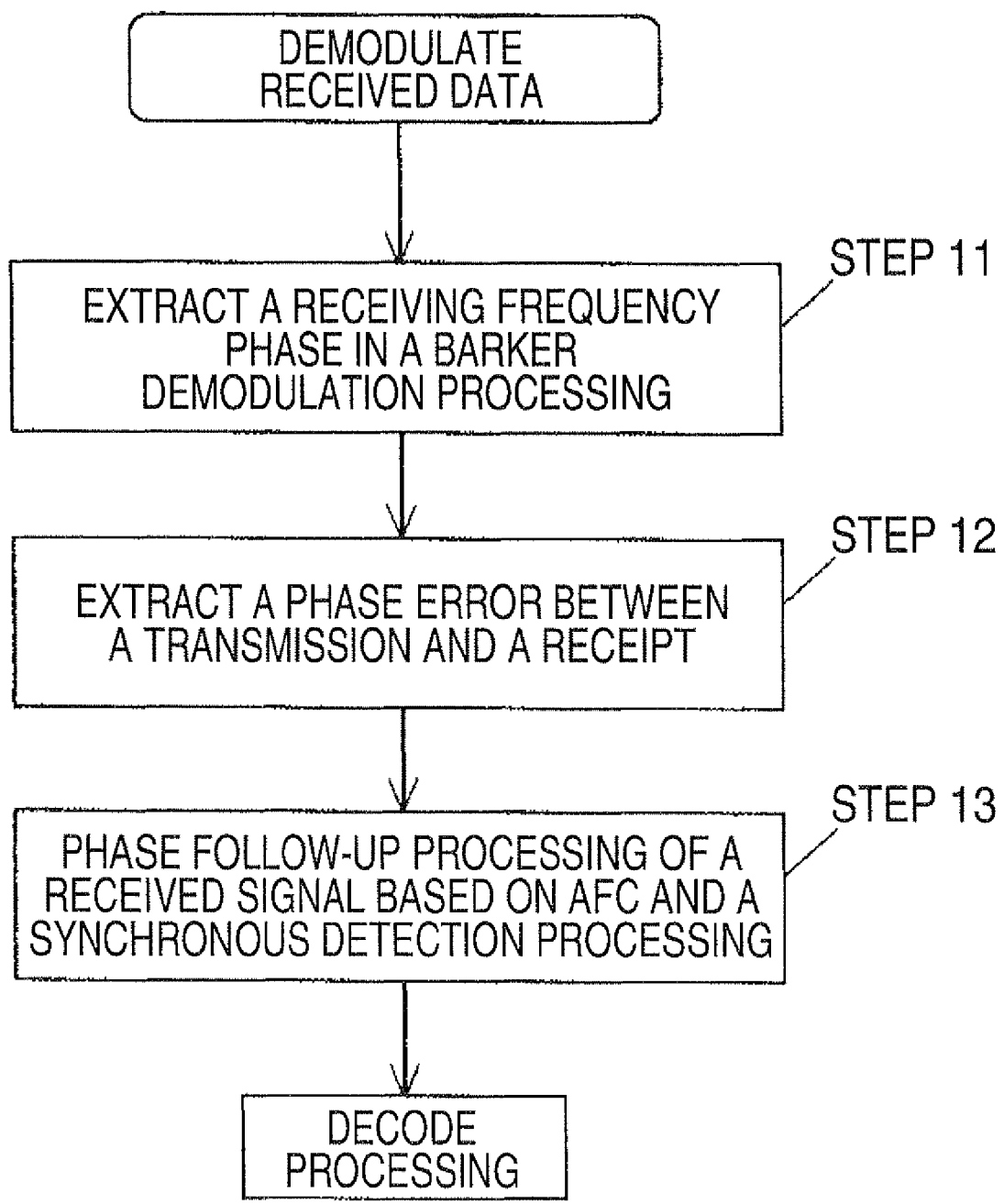
FIG. 17 is a flowchart showing an operation of the synchronous detection circuit according to the third embodiment.

FIG. 17 is a flowchart showing an operation of the synchronous detection circuit 300 according to the third embodiment.

In FIG. 17, the received data are demodulated by a wireless high frequency portion. After the received data are demodulated into a baseband signal, a receiving phase of the received signal is extracted by the Barker demodulating portion (Step 11).

By subtracting the modulated phase from the phase data, a phase error between a transmission and a receipt is brought (Step 12).

Based on the signal, a frequency error caused by a disturbance is eliminated and a phase error from a former symbol is extracted. By a serial processing, AFC and a synchronous detecting demodulation are carried out. Based on the phase thus extracted, the phase of the received signal is rotated to carry out the follow-up of a frequency and a phase with a transmitting frequency (Step 13).

As a result, the signal from which the influence of the disturbance in the wireless environment is eliminated is reproduced normally so that data having no error are extracted.

As described above, the synchronous detecting device according to the third embodiment can carry out the follow-up of a frequency and can normally maintain a receipt processing of a wireless receiving device for a wireless communication environment in which there is changed a tendency of an extraction of a frequency and a phase error between a transmission and a receipt and a situation and interference of a communication error corresponding to the passage of time through a wireless section. As a result, it is possible to effectively utilize a limited communication band, and furthermore, to provide a suitable communication for a real-time communication system such as an image or a voice.

Moreover, the synchronous detecting device according to the third embodiment extracts the frequency and the phase error between the transmission and the receipt by using the Barker code. This is implemented by using a code having a great autocorrelation characteristic and can also be implemented by using a code having a high correlation characteristic, for example, CCK (Complementary Code Keying).

While the description has been given to the third embodiment by taking the wireless LAN communication as an example, furthermore, it is also possible to apply the invention to a real-time communication such as a digital broadcast or a bidirectional real-time communication such as a telephone.

Embodiment 4

A structure of a communicating apparatus according to a fourth embodiment is the same as that shown in FIGS. 1 to 4 according to the first embodiment.

Figure 18:
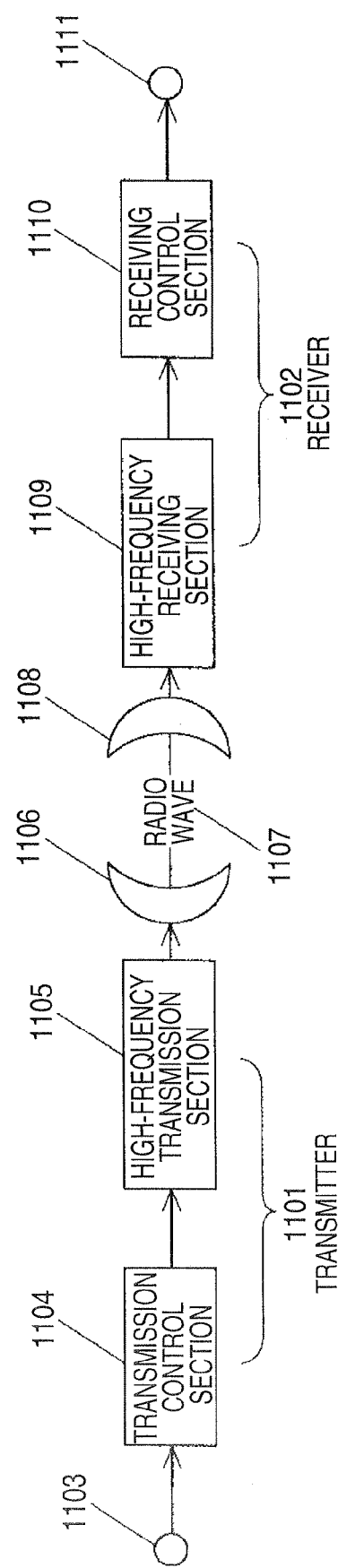
FIG. 18 is a block diagram of a radio communications system of a fourth embodiment of the present invention.
Figure 19:
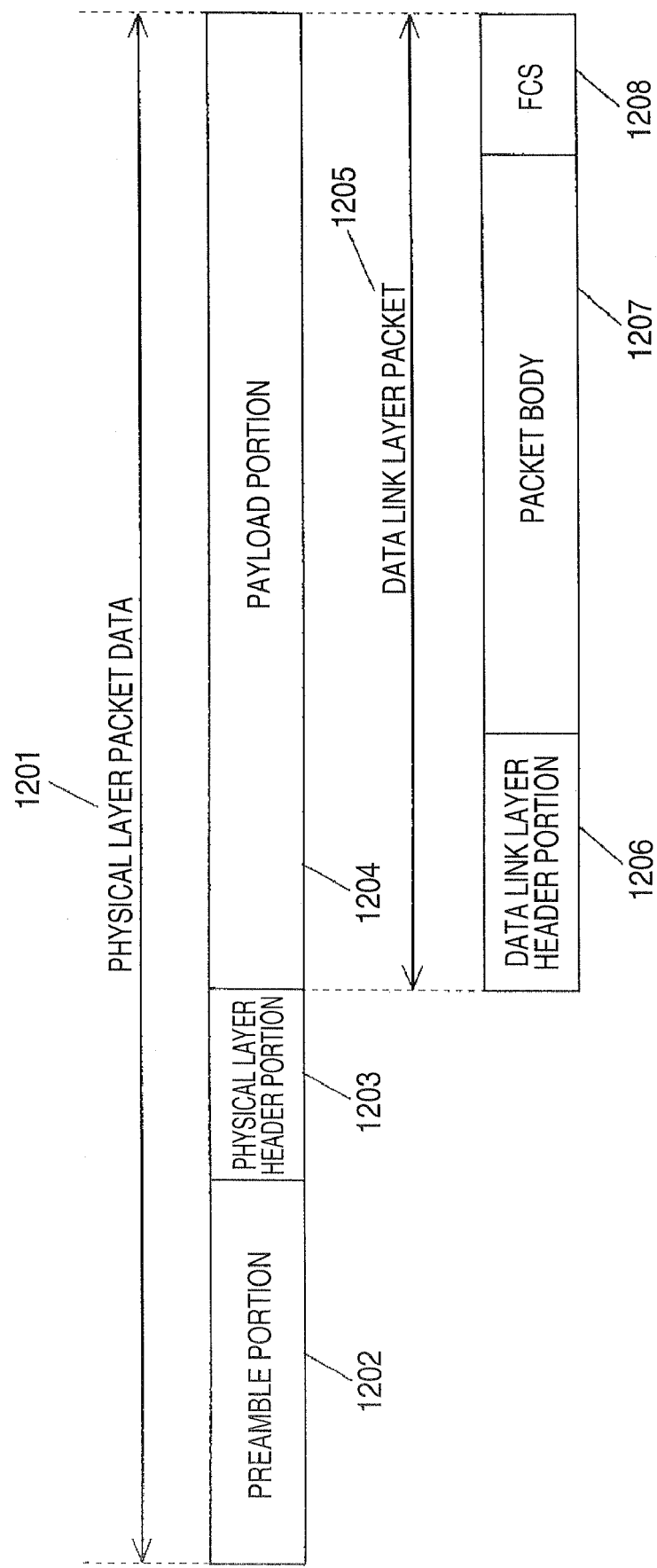
FIG. 19 is a view showing the configuration of a packet for use in radio communication of the first embodiment of the present invention.
Figure 20:
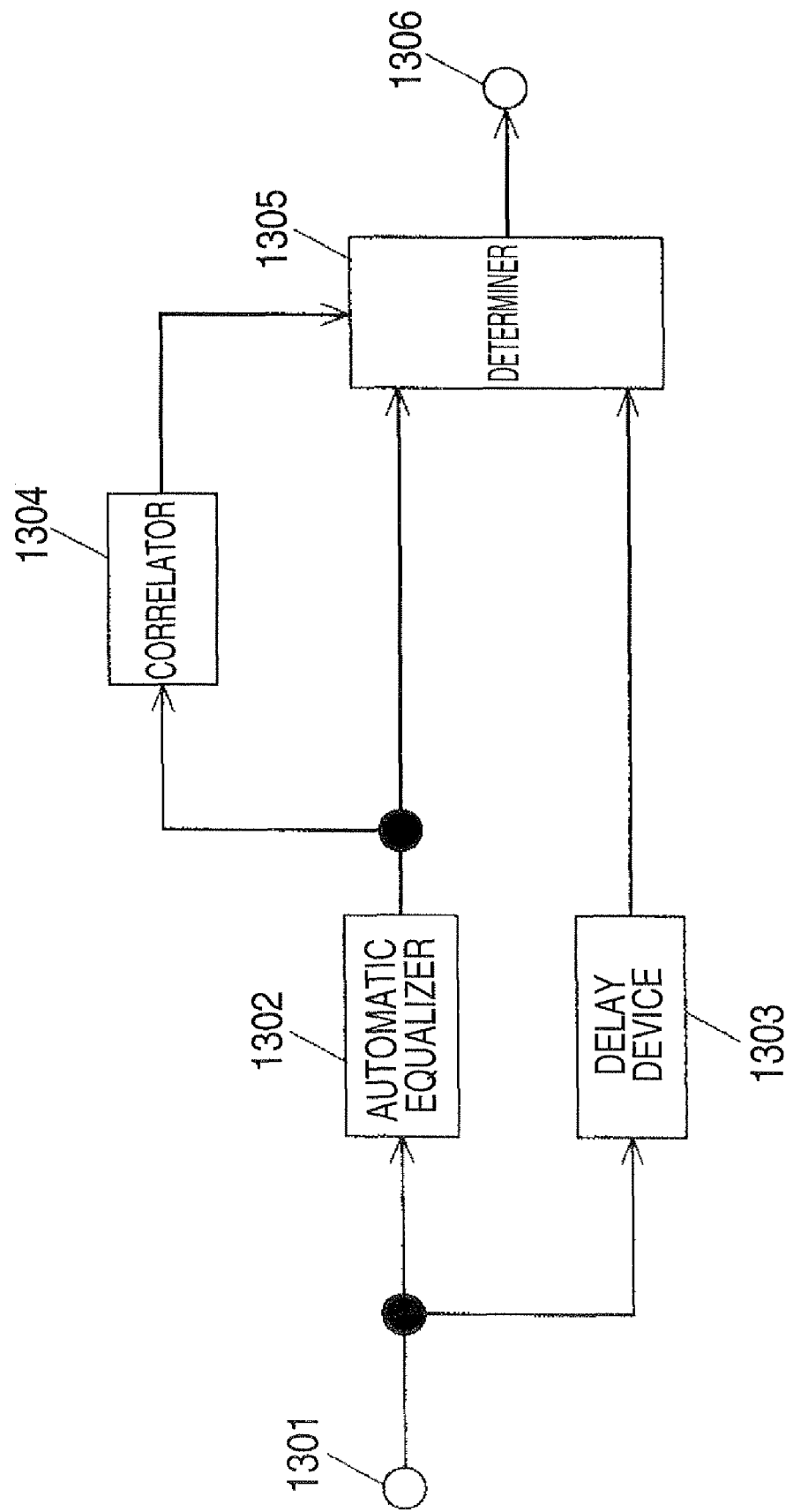
FIG. 20 is a block diagram of an automatic equalizing system of first through third embodiments of the present invention.
Figure 21:
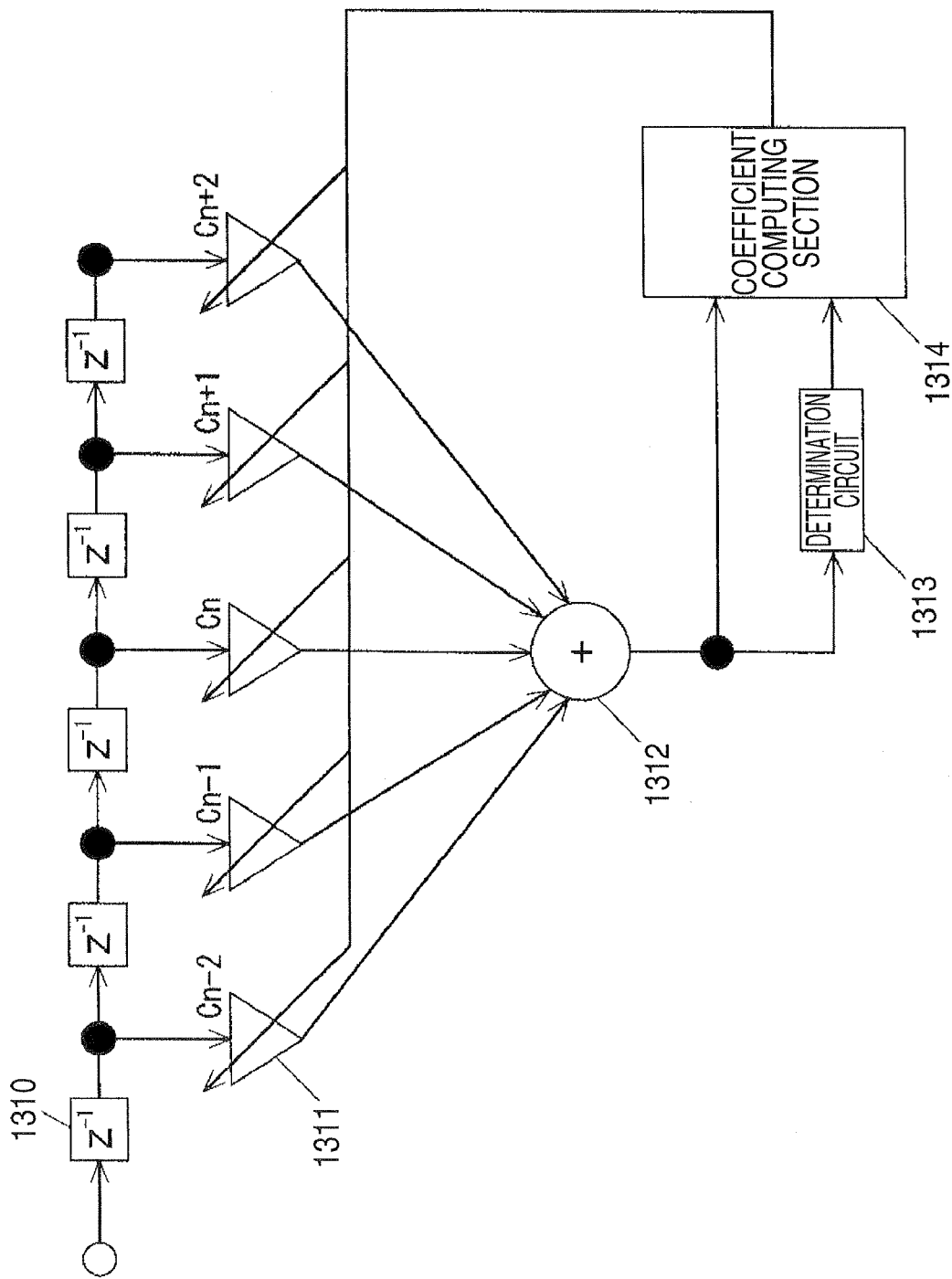
FIG. 21 is a view showing a filter coefficient computing section of an automatic equalizer of the fourth embodiment of the present invention.
Figure 22:
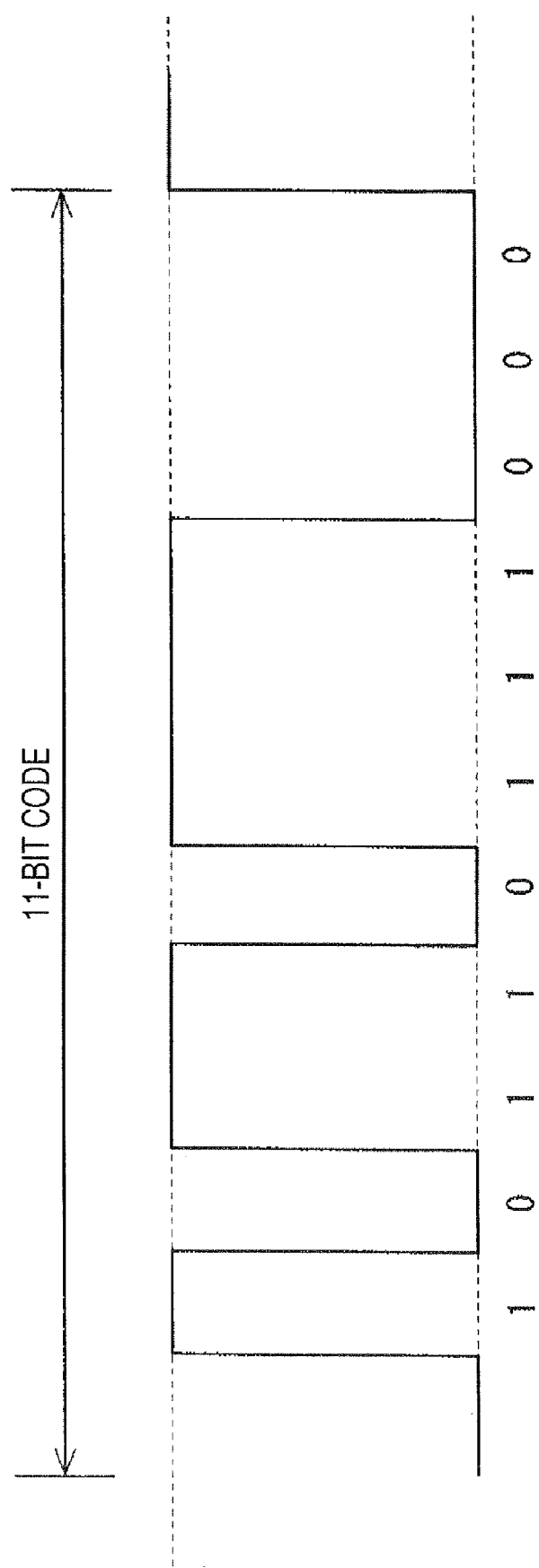
FIG. 22 is a view showing a Barker code of a correlator of the fourth embodiment of the present invention.
Figure 23A:
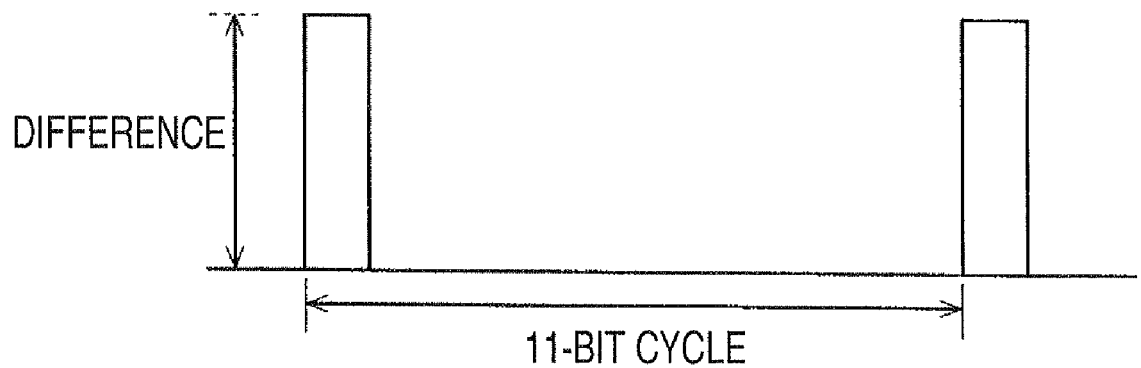
FIGS. 23(a) and 23(b) are views showing an autocorrelation characteristic of the correlator of the fourth embodiment of the present invention.
Figure 23B:
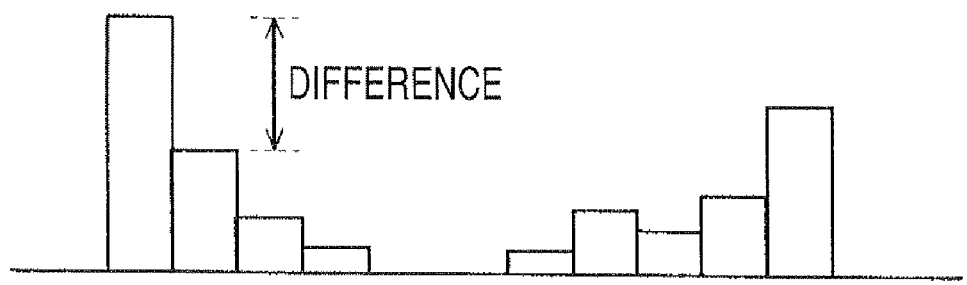
Figure 24:
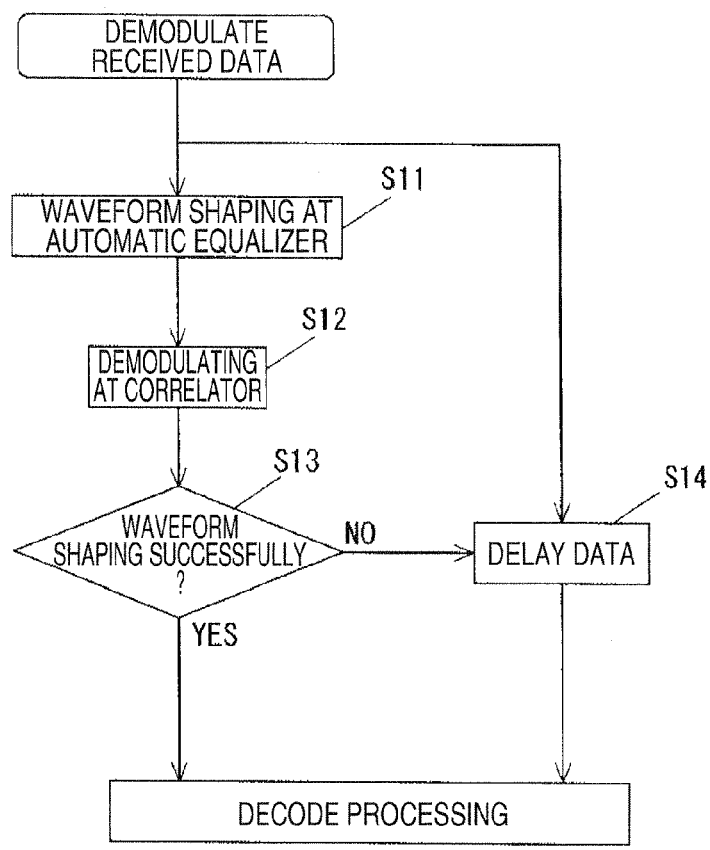
FIG. 24 is a flowchart for determining, by use of data from the correlator, whether or not the equalizer of the fourth embodiment of the present invention operates properly.

A fourth embodiment of the present invention will be described by reference to FIGS. 18 through 24. FIG. 18 is a block diagram of a radio communications system of a first embodiment of the present invention; FIG. 19 is a view showing the configuration of a packet for use in radio communications of the fourth embodiment of the present invention; FIG. 20 is a block diagram of an automatic equalizing system of fourth through sixth embodiments of the present invention; FIG. 21 is a view showing a filter coefficient computing section of an automatic equalizer of the fourth embodiment of the present invention; FIG. 22 is a view showing a Barker code of a correlator of the fourth embodiment of the present invention; FIGS. 23(a) and 23(b) are views showing an autocorrelation characteristic of the correlator of the forth embodiment of the present invention; and FIG. 24 is a flowchart for determining, by use of data from the correlator, whether or not the equalizer of the fourth embodiment of the present invention operates properly.

The automatic equalizing system of the present embodiment is applied to a system using a wireless LAN communications scheme employed in a wireless network system configured as a system for exchanging video data, audio data, computer data, or the like, in; e.g., the home or a comparatively-small-sized office. A wireless LAN system which is typical as a radio communications system will be described as an example.

First, in FIG. 18 showing the system configuration of the entire radio communications system, a transmission control section 1104 forms transmission data 1103 to be transmitted by a transmitter 1101 as packet data for communication purpose shown in FIG. 19.

In common radio communications, physical layer packet data 1201 formed in FIG. 19 are transmitted as a single block. In the packet configuration shown in FIG. 19, the physical layer packet data 1201 serving as a single block comprise a preamble section 1202 for controlling receipt timing synchronization; a physical layer header section 1203 serving as control information such as an address of a destination to which the packet is to be sent; and a payload section 1204 serving as actual physical layer data. The payload section 1204 serving as the physical layer data is a data link layer packet 1205. The payload section 1204 comprises a data link layer header section 1206 serving as control information, a packet body 1207 serving as user data to be transmitted; and an FCS (Frame Check Sequence) 1208 for checking an error in a packet.

A high-frequency transmission section 1105 subjects the physical layer packet data 1201 to digital modulation and radio frequency modulation for the purpose of radio communication, and the modulated data are transmitted in the air from a transmission antenna 1106 and in the form of a radio wave 1107 while being superimposed on a radio carrier frequency. Through use of a receiving antenna 1108 of the receiver, a receiver 1102 receives the signal conveyed by the radio wave 1107 generated by the transmitter 1101. A high-frequency receiving section 1109 demodulates a radio-modulated signal, and a receiving control section 1110 subjects the signal to digital demodulation, thereby demodulating the physical layer packet data 1201. Received data 1111 are reproduced from the physical layer packet data 1201, whereby radio communication is implemented.

However, in radio communication effected in the space, a multipath fading or deterioration of frequency-phase characteristics attributable is assumed to take place in a transmission channel, and various types of signal deterioration, such as signal deterioration due to interference of a single frequency, are assumed to arise moment by moment. An automatic equalizer serves as signal processing means for playing an important role as means for overcoming signal deterioration, and an improvement in performance of this automatic equalizer is indispensable.

FIG. 20 shows the block diagram of the automatic equalizing system of the present invention. This is an automatic equalizing system for performing waveform-shaping operation of the receiving control section 1110 shown in FIG. 18. An automatic equalizer 1302 subjects a received digital signal 1301 to equalization processing, and a delay device 1303 generates the received digital signal 1301 synchronized with a delay in the signal caused by equalizing operation of the equalizer. The received digital signal 1301 is input to a determiner 1305 along with the data output from the equalizer. A correlator 1304 determines an autocorrelation characteristic of the data from the automatic equalizer 1302. In accordance with the autocorrelation characteristic, the determiner 1305 selects either the data output from the automatic equalizer 1302 or data output from the delay device 1303, and outputs a data output signal 1306. Filter coefficient update means of the automatic equalizer 1302 consecutively updates a filter coefficient by means of a configuration shown in FIG. 21. Here, an automatic equalizer whose filter coefficient corresponds to five taps is taken as an example. The present embodiment is applied to automatic equalizers whose filter coefficients correspond to an arbitrary number of taps which is equal to or greater than three taps.

In FIG. 21, an input signal is input to five tap coefficients 1311 by means of five shift registers 1310. Values of the tap coefficients are summed by an adder 1312, and a resultant sum is output to a determination circuit 1313 and a coefficient computing section 1314. The tap coefficients 1311 of the automatic equalizer are numbered, in sequence from an input side, Cn–2, Cn–1, Cn, Cn+1, Cn+2. Tap coefficients are computed by means of the following equation according to a change in the transmission channel during the course of operation of the automatic equalizer.

$$Ck+1(n)=Ck(n)-\alpha \times Err \times Zk(n) (0 \leq \alpha \leq 1)$$ (Mathematical Equation 1).

In the equation, Ck(n) designates the value of a current filter tap coefficient; Err designates a value computed by the determination circuit 1313 shown in FIG. 21; Zk(n) designates a value stored in the shift registers 1310 of respective Z–1; and Ck+1(n) designates a tap coefficient used at the next shift timing.

A Barker code is used in a wireless LAN system for those sets of correlation data from the correlator 1304 which are employed in the present embodiment. The Barker code is a spread-code-and-despread-code sequence which has a fixed pattern of 11 chips shown in FIG. 22 and which computes an 11-bit code length by means of data identical with the received signal, to thus derive an autocorrelation signal. By use of the correlation code, an autocorrelation characteristic is determined every 11 bits in connection with the data output from the automatic equalizer 1302. As shown in FIGS. 23(*a*) and 23(*b*), an autocorrelation characteristic is derived by means of taking a difference between a first peak value and a second peak value as a parameter. As shown in FIG. 23(*a*), in the case of reproduced data output from an ordinary equalizer, high autocorrelation data are output every 11 bits, and data exhibiting a high autocorrelation characteristic are output as difference data. However, when received data have been deteriorated, a signal error takes place, and a failure also arises in processing for shaping the waveform of the data output from the equalizer. Thus, deterioration of an autocorrelation characteristic; that is, a decrease in difference data such as that shown in FIG. 23(*b*) arises. The present system is for determining whether or not the automatic equalizer 1302 is defective by utilization of the characteristics and selecting normal data at all times by means of the determiner 1305.

The flow of processing will now be described by reference to a flowchart shown in FIG. 24. Data received by the receiver are demodulated by a wireless high frequency section. After the received data have been demodulated into a baseband signal, the automatic equalizer subjects the demodulated data to waveform shaping (S11). The signal is demodulated into data by the correlator (S12), and an autocorrelation characteristic of the data is evaluated. In accordance with the autocorrelation characteristic, a determination is made as to whether or not waveform shaping is performed successfully (S13). When waveform shaping is successful, the data processed by the equalizer are selected as received data. In contrast, when the determiner does not determine waveform shaping to be successful, the data that have been achieved before equalization and are delayed by an amount corresponding to a delay time required by equalization are selected and output to decoding operation (S14).

Embodiment 5

A structure of a communicating apparatus according to a fifth embodiment is the same as that shown in FIGS. 1 to 4 according to the first embodiment.

Figure 25:
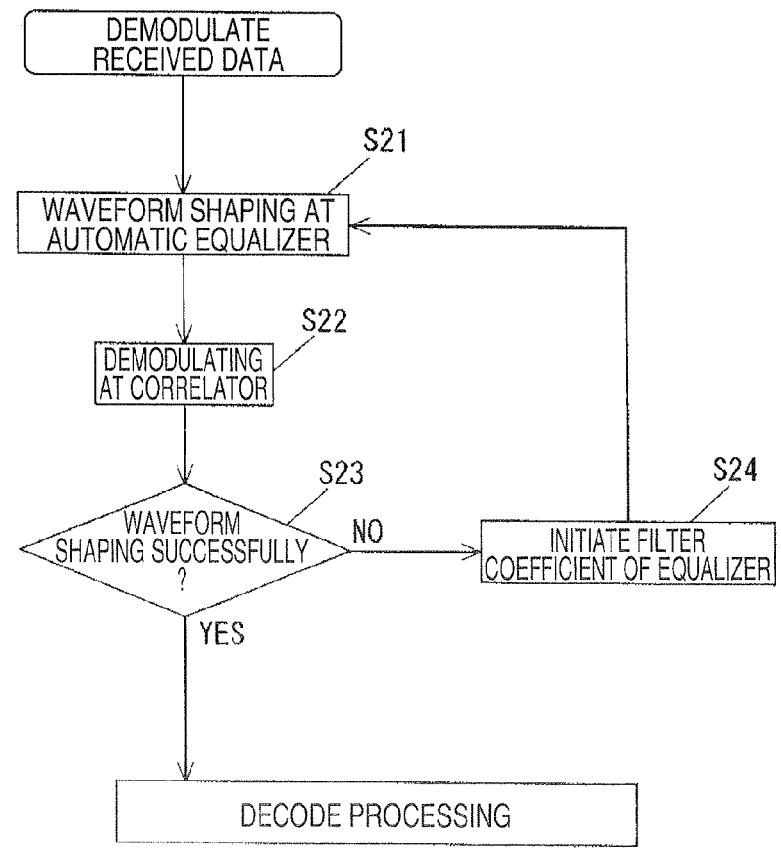
FIG. 25 is a flowchart for initializing a filter coefficient by means of rendering a determination as to whether or not the equalizer of a fifth embodiment of the present invention operates properly.

A fifth embodiment of the present invention will now be described by reference to FIGS. 20 and 25.

An automatic equalization system of the present embodiment performs communication processing for shaping the waveform of a signal received by a radio system employed as a current radio communications system. An explanation is provided while a wireless LAN system which is typical as a radio communications system is taken as an example.

The entire configuration of the automatic equalization system is common to the automatic equalization system (see FIG. 20) employed in the fourth embodiment. In the present embodiment, the tendency of an autocorrelation signal is determined from a result of an output from the correlator 1304 of the automatic equalization system, and the degree of divergence of tap coefficient data pertaining to equalization coefficients is determined from a difference between first peak data and second peak data which belong to 11 bits shown in FIGS. 23(a) and 23(b). For instance, when the difference data correspond to a small value (which is equal to or smaller than a certain threshold value), the coefficient of the automatic equalization system is deemed to exhibit divergence, and normal processing of received data is acknowledged to be inoperable. In this case, the filter coefficient for the automatic equalization processing is initialized, thereby canceling divergence of automatic equalization processing. Thus, control is performed so as to stop a failure of subsequent operation of the system and achieve early recovery of the system. Consequently, divergence of a coefficient of the automatic equalization circuit attributable to a failure of a receiving level is detected, and high-speed restoration of system operation becomes feasible.

The flow of processing will now be described by reference to a flowchart for initializing a filter coefficient by means of determining whether or not an equalizer of the second embodiment of the present invention shown in FIG. 25 operates properly. The data received by a receiver are demodulated by the radio high frequency section, and the received data are demodulated into a baseband signal. Subsequently, the automatic equalizer subjects the data to waveform shaping (S21). The correlator demodulates data from the signal (S22), and an autocorrelation characteristic of the data is evaluated. A determination is made, in accordance with this autocorrelation characteristic, as to whether or not waveform shaping is successful (S23). When waveform shaping is successful, the data processed by the equalizer are selected as received data, and computation of a filter tap coefficient of the equalizer is continued. However, when deterioration of a signal has occurred in a space radio environment for reasons of fading, signal interference, or the like, and when a tendency to fail waveform shaping in automatic equalization has become obvious, the filter coefficient of automatic equalization is initialized (S24), and high-speed restoration of normal operation is enabled.

Embodiment 6

A structure of a communicating apparatus according to a sixth embodiment is the same as that shown in FIGS. 1 to 4 according to the first embodiment.

Figure 26:
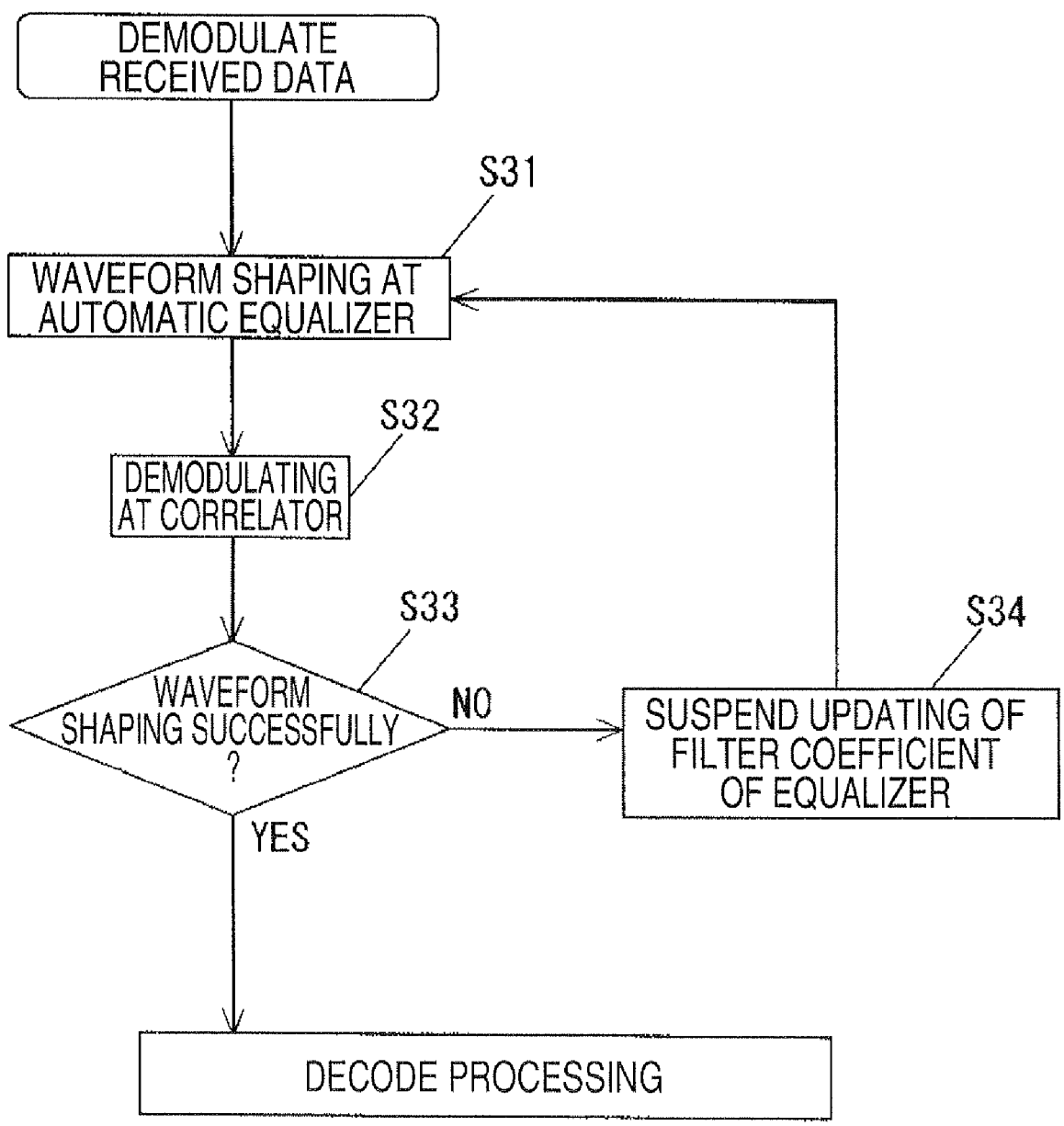
FIG. 26 is a flowchart for temporarily suspending a filter coefficient by means of rendering a determination as to whether or not the equalizer of a sixth embodiment of the present invention operates properly.

A sixth embodiment of the present invention will be described by reference to FIGS. 20 and 26.

An automatic equalization system of the present embodiment performs communication processing for shaping the waveform of a signal received by a radio system employed as a current radio communications system. An explanation is provided while a wireless LAN system which is typical as a radio communications system is taken as an example.

The entire configuration of the automatic equalization system is common to the automatic equalization system (see FIG. 20) employed in the fourth embodiment. In the present embodiment, the tendency of an autocorrelation signal is determined from a result of an output from the correlator 1304 of the automatic correlation system and by means of a difference between first peak data and second peak data which belong to 11 bits shown in FIGS. 23(a) and 23(b). Divergence of the coefficient of the automatic equalization system is temporarily detected, and a filter coefficient for automatic equalization is temporarily suspended. Thus, divergence of automatic equalization processing is inhibited, and high-speed recovery of normal operation is enabled.

The flow of processing will now be described by reference to a flowchart for temporarily suspending update of a filter coefficient by means of a determination as to whether or not an equalizer of the third embodiment of the present invention shown in FIG. 9 operates properly. The data received by a receiver are demodulated by the radio high frequency section, and the received data are demodulated into a baseband signal. Subsequently, the automatic equalizer subjects the data to waveform shaping (S31). The correlator demodulates data from the signal (S32), and an autocorrelation characteristic of the data is evaluated. A determination is made, in accordance with this autocorrelation characteristic, as to whether or not waveform shaping is successful (S33). When waveform shaping is successful, the data processed by the equalizer are selected as received data, and computation of a filter tap coefficient of the equalizer is continued. However, when deterioration of a signal has temporarily occurred in a space radio environment for reasons of fading, signal interference, or the like, and when a tendency to fail waveform shaping in automatic equalization has become obvious, updating of the filter coefficient performed through automatic equalization is temporarily suspended (S34). Automatic equalization processing is performed by use of the same coefficient until the correlator determines data to be normal. Consequently, an anomaly in update of the filter coefficient of the automatic equalizer due to temporary deterioration of a signal can be eliminated, and high-speed restoration of normal operation is enabled.

By means of control of the automatic equalization system of the fourth, fifth, and sixth embodiments, there is provided a system which performs desirable communication control of a communications terminal—requiring transfer of a predetermine amount of data within a given period of time—in real-time communication which is limited in terms of a time for communication of images or sound, even in a radio communication environment which changes from moment to moment. There is provided a system which maintains the normal state of communication data or enables high-speed recovery of normal operation by means of detecting occurrence of a failure in communication in advance and performing appropriate processing.

As mentioned above, the automatic equalization system of the present invention enables rendering of an accurate determination as to whether or not an automatic equalization operates properly and keeping of normal operation of an equalizer, by means of performing automatic equalization involving waveform shaping through use of processing of a correlator which performs divergence processing, even in a radio communications situation where the state of a communication error or the tendency of interference changes with elapse of a time. Consequently, effective utilization of a limited communication band is enabled, and preferable communication can be provided in a real-time communications system for images or sound.

Moreover, the present invention relates to a radio communications system but is not limited to a package medium for images or sound (a CD, or the like) which is available in the home. The present invention may also be directed toward data communication, real-time communication such as digital broadcasting, or bidirectional real-time communication such as a telephone.

Embodiment 7

A structure of a communicating apparatus according to a seventh embodiment is the same as that shown in FIGS. 1 to 4 according to the first embodiment.

Figure 27:
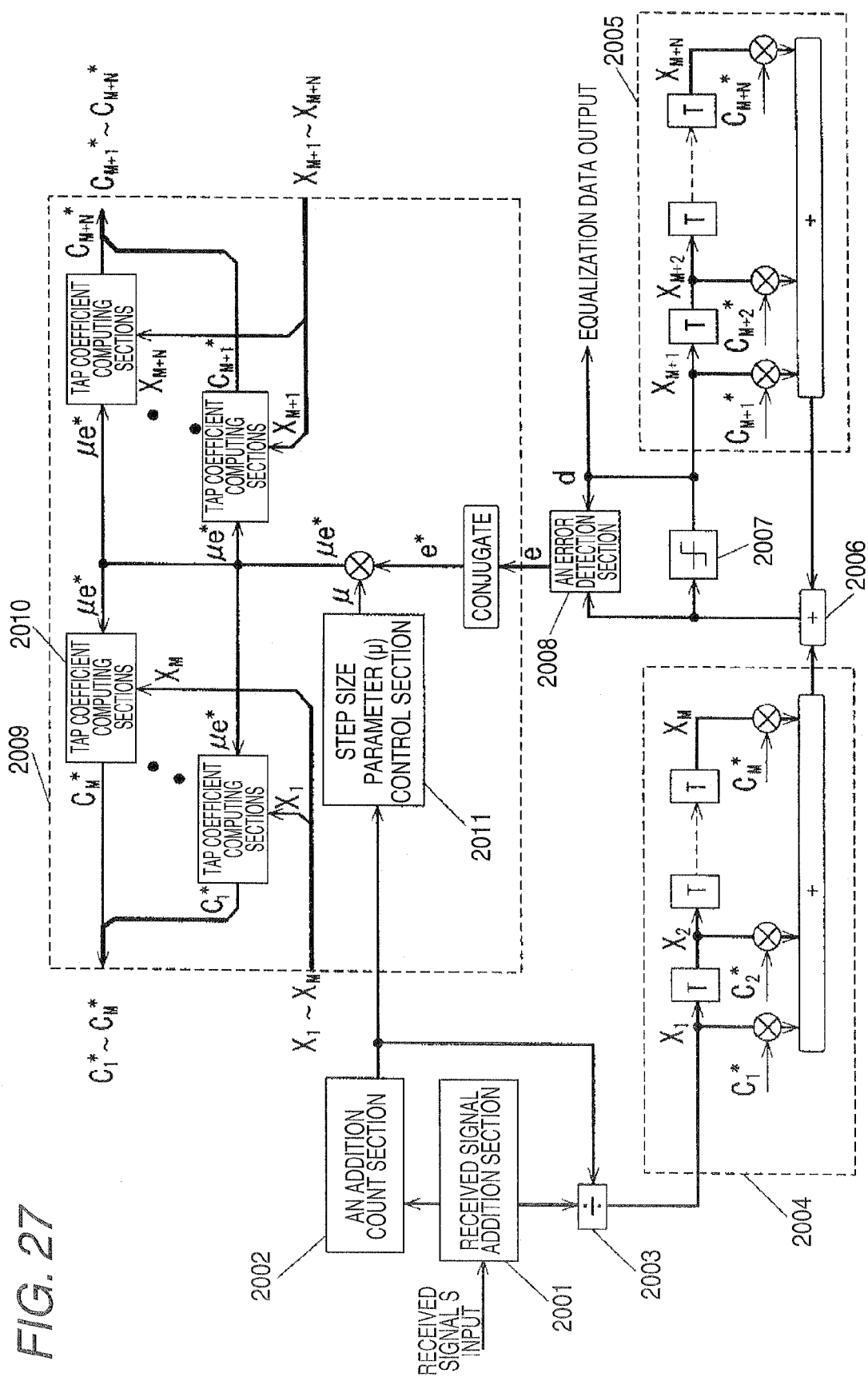
FIG. 27 is a block diagram showing an adaptive equalizer of a seventh embodiment of the present invention.
Figure 28:
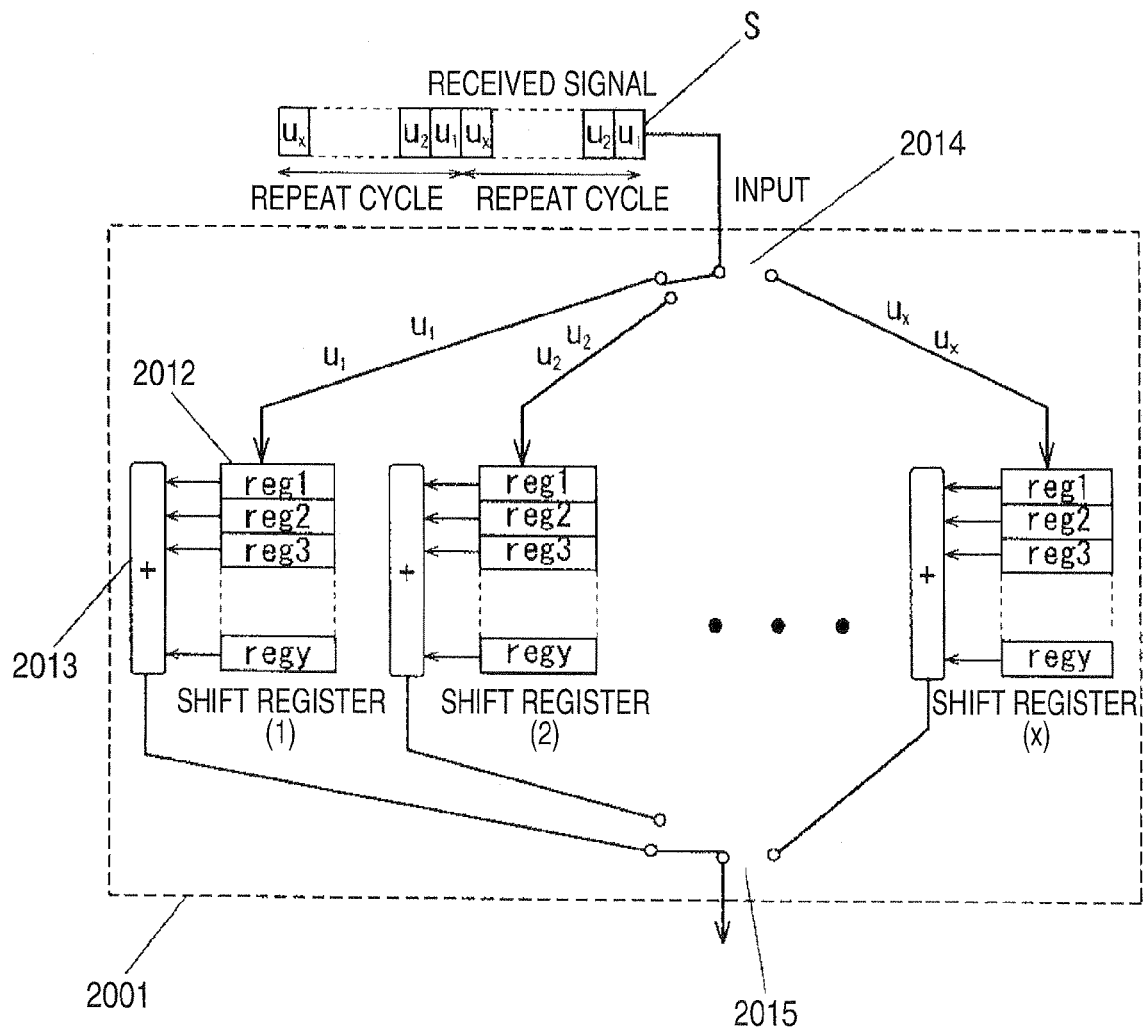
FIG. 28 is a block diagram showing a received signal addition section of the adaptive equalizer shown in FIG. 27.
Figure 29:
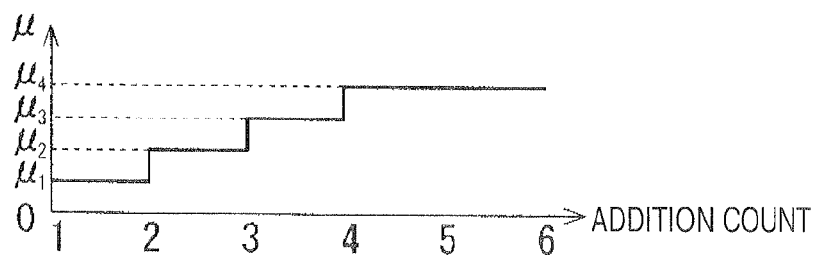
FIG. 29 is a view diagrammatically showing a stepwise increase in a step size parameter output from a step size parameter control section of the adaptive equalizer shown in FIG. 27 in accordance with the number of received signals to be added.

An adaptive equalizer of a seventh embodiment of the present invention will be described hereunder by reference to FIGS. 27 through 29. FIG. 27 is a block diagram showing an adaptive equalizer of the seventh embodiment of the present invention. FIG. 28 is a block diagram showing a received signal addition section of the adaptive equalizer shown in FIG. 27. FIG. 29 is a view diagrammatically showing a step-wise increase in a step size parameter output from a step size parameter control section of the adaptive equalizer shown in FIG. 27 in accordance with the number of received signals to be added.

As shown in FIG. 27, the adaptive equalizer of the present embodiment has a received signal addition section 2001; an addition count section 2002; a division section 2003; a first transversal filter 2004; a second transversal filter 2005; an adder 2006; a determiner 2007; an error detection section 2008; and a tap coefficient update section 2009.

The received signal addition section 2001 has at least two or more shift registers for retaining a received signal S converted into a baseband signal and data addition sections for adding iterative patterns of the retained received signal S. The addition count section 2002 counts the number of received signals added by the received signal addition section 2001. The division section 2003 is one which divides a signal output from the received signal addition section 2001 by the number of added, received signals (an addition count) determined by the addition count section 2002. The first transversal filter 2004 functions as a feedforward section; and receives an input of a signal from the division section 2003 and produces an output to the adder 2006. The second transversal filter 2005 functions as a feedback section; and receives an input of a signal from the determiner 2007 and produces an output to the adder 2006. The adder 2006 adds an output from the first transversal filter 2004 to an output from the second transversal filter 2005. The determiner 2007 determines an output from the adder 2006 at every symbol period T by means of a threshold value. The error detection section 2008 outputs, as an error signal "e," a difference between an output from the adder 2006 and a reference signal "d" output from the determiner 2007. The tap coefficient update section 2009 adaptively controls respective tap coefficients in accordance with values $(X_1, X_2, X_3, \ldots, X_M, X_{M+1}, X_{M+2}, \ldots, X_{M+N})$ achieved at respective delay taps of the first and second transversal filters 2004 and 2005 and the error signal "e" output from the error detection section 2008. Here, the input signals and signals of other sections may also be embodied by a complex signal formed from an in-phase component and a quadrature component obtained through quadrature detection.

The tap coefficient update section 2009 has tap coefficient computing sections 2010 and a step size parameter control section 2011. The tap coefficient computing sections 2010 are provided for respective tap coefficients. The tap coefficient computing section computes a tap coefficient from a product $\mu e^*$ consisting of a conjugate of the error signal "e" and a step size parameter $\mu$ and the values $(X_1, X_2, X_3, \ldots, X_M, X_{M+1}, X_{M+2}, \ldots, x_{M+N})$ achieved at the respective taps. The step size parameter control section 2011 outputs the step size parameter $\mu$ in accordance with the number of received signals S added by the received signal addition section 1 which has been determined by the addition count section 2002.

The configuration of the received signal addition section 2001 will now be described in detail by reference to FIG. 28. As shown in FIG. 28, the received signal addition section 2001 has shift registers 2012; the adders 2013; a first switch 2014; and a second switch 2015.

Each of the shift registers 2012 has registers (of the number of "y") equal in number to received signals S to be added, each received signal including "x" symbols in one period and iterating the same pattern at least during a period of update of a tap coefficient; and shift registers (of the number of "x") equal in number to the symbols included in the iterative period of the received signal S. The adder 2013 is a data addition section for adding values of the respective registers included in the shift register 2012. The first switch 2014 is for allocating received signals S corresponding to input signals sequentially to the respective shift registers. The second switch 2015 is for selecting outputs from the respective adders 2013 and outputting the selected output. Every time the received signal S is captured, the second switch 2015 sequentially switches an addition output (an output from the adder 2013) from a shift register (1) to a shift register (x).

A step size parameter output by the step size parameter control section 2011 of the tap coefficient update section 209 shown in FIG. 27 will be described in more detail by reference to FIG. 29. As shown in FIG. 29, the step size parameter control section 2011 outputs, as a step size parameter $\mu$, $\mu_1$ when the number of received signal to be added is one; that is, when only one received signal S is input to each of the shift registers 2012 of the received signal addition section 201; $\mu_2$ when the received signal S is added to the respective shift registers 2012 and the number of received signals to be added is two; and $\mu_4$ when the number of received signals to be added is four or more, in such a way that a relationship of $\mu_1 < \mu_2 < \mu_3 < \mu_4$ is attained.

Operation of the adaptive equalizer of the first embodiment of the present invention which is configured as mentioned above will be described.

As shown in FIGS. 27 and 28, when the received signal S is input to the received signal addition section 2001, a head symbol $u_1$ of the received signal S is captured by the shift register (1) by way of the first switch 2014 and output by way of the second switch 2015. Subsequently, the first switch 2014 and the second switch 2015 are changed, and the next symbol $u_2$ is captured by a shift register (2) by way of the thus-changed first switch 2014 and output by way of the second switch 2015 changed likewise. Changing of the first and second switches 2014 and 2015 is repeated until a symbol ux. Ahead symbol $u_{1'}$ in an iterative period of the next received signal S is captured by the shift register (1), and the sum of $u_1$ and $u_{1'}$ is output from the received signal addition section 2001. Likewise, the next symbol $u_{2'}$ is input to the shift register (2), and the sum of $u_2$ and $u_{2'}$ is output from the adder 2013 by way of the second switch 2015. The number of symbols to be added is determined by the number of registers (y) provided in each of the shift registers.

As shown in FIG. 27, the addition count section 2002 is means, or the like, in which a counter is triggered by the received signal S; and counts the number of symbols to be added by each of the shift registers 2012 in the received signal addition section 2001. The division section 2003 divides the signal output from the received signal addition section 2001 by the number of added symbols determined by the addition count section 2002, to thus perform averaging operation. A divisor starts from one, and the maximum divisor is "y." The rate of noise components included in the received signal S is reduced by averaging operation. Moreover, the greater the number of received signals used for averaging as a result of an increase in the number of additions, the smaller the rate of noise components. Thus, a signal-to-noise ratio of the received signal is improved.

The signal having passed through the division section 2003 is processed by the first transversal filter 2004 and output to the adder 2006. An output from the second transversal filter 2005 is added to the adder 2006, whereby equalization processing is performed. A result of determination rendered by the determiner 2007 is output as an equalized output.

The determination result rendered by the determiner 2007 is supplied as a reference signal "d" to the error detection section 2008, as well. An error signal "e" between the reference signal "d" and the output from the adder 6 is generated. The tap coefficient update section 2009 determines a tap coefficient from the error signal "e" and the value acquired at each of the taps, and a tap coefficient of the first transversal filter 2004 and a tap coefficient of the second transversal filter 2005 are consecutively updated. Now, the tap coefficient update section 2009 derives an update value from a product $\mu e^*$ consisting of a conjugate $e^*$ of the error signal "e" and a step size parameter $\mu$ output from the step size parameter control section 2011 and the values "x" achieved at the respective taps, in accordance with Equation (1) from which a coefficient update value is derived by means of a least mean square (LMS) algorithm. As shown in FIG. 29, the step size parameter control section 2011 sets the step size parameter $\mu$ to $\mu_1$ when the number of symbols to be added counted by the addition count section 2002 is one. In subsequent operations, the step size parameter is increased stepwise to $\mu_2$ and $\mu_3$ in accordance with an increase in the number of symbols to be added. When the number of symbols to be added is four or more, the step size parameter $\mu$ is output as $\mu_4$.

When averaging operation has not sufficiently proceeded immediately after initiation of input of a received signal, the signal-to-noise ratio of the received signal is not sufficiently improved. There may also arise a case where the direction of a vector of an update value for the tap coefficient deviates from the direction of a vector achieved in a converged state. When a comparatively-large step size parameter $\mu_4$ is used while the number of symbols to be added is four, convergence is delayed or divergence takes place. Conceivable measures are to stop updating of the tap coefficients before averaging of a received signal proceeds sufficiently; however, this involves extension of a time consumed before convergence. Accordingly, the step size parameter is set to a comparatively-small value $\mu_1$, to thus reduce the extent to which the tap coefficient is updated; and to prevent occurrence of large deviation even when the direction of a vector of an update value of a tap coefficient deviates from the direction of a vector achieved in the converged state. As a result, the time required to converge a tap coefficient can be shortened while the convergence of the tap coefficient is maintained. Meanwhile, when averaging operation has proceeded as a result of an increase in the number of symbols to be added, the step size parameter $\mu$ is changed to a greater value, and the tap coefficient is updated to a greater value.

As above, according to the adaptive equalizer of the present embodiment, even when the signal-to-noise ratio of a received signal is small, the received signal can be input to the transversal filters after the signal-to-noise ratio of the received signal has been improved by means of averaging operation, and delay distortion can be eliminated from the received signal. Moreover, even when the signal-to-noise ratio of the received signal has not yet been improved sufficiently immediately after input of the received signal, update of the tap coefficient is caused to proceed. Hence, the time required to converge the tap coefficient can be shortened.

Embodiment 8

A structure of a communicating apparatus according to an eighth embodiment is the same as that shown in FIGS. 1 to 4 according to the first embodiment.

Operation of the adaptive equalizer including the training signal generator of the present invention will be described.

Figure 30:
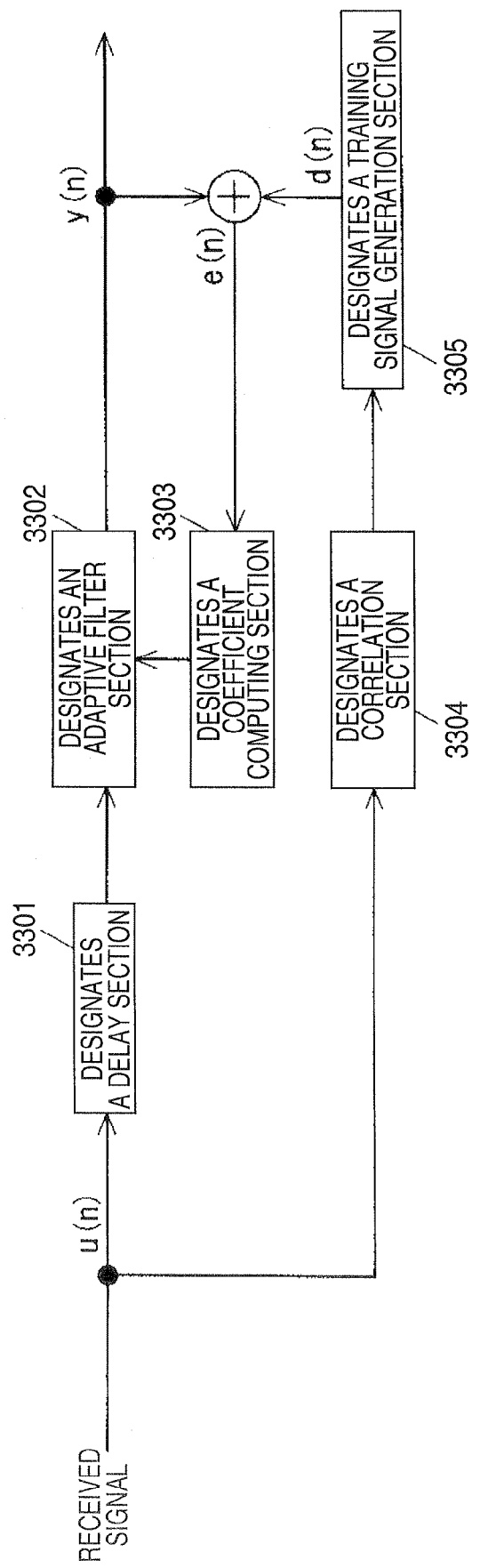
FIG. 30 is a view showing an example configuration of the adaptive equalizer including the training signal generator of the present invention.

FIG. 30 is a view showing an example configuration of the adaptive equalizer including the training signal generator of the present invention. In FIG. 30, reference numeral 3301 designates a delay section which, upon receipt of a radio-demodulated received signal u(n), outputs an input signal u(n) after lapse of a time corresponding to a processing delay time required by a correlation section 3304 to be described later. Reference numeral 3302 designates an adaptive filter section which reproduces transmission data from the received signal u(n) and which outputs a result of reproduction as a signal y(n). Reference numeral 3303 designates a coefficient computing section for computing a filter tap coefficient of the adaptive filter section 3302 from a difference (error) signal e(n) between the reproduced signal y(n) and a training signal d(n). Reference numeral 3304 designates a correlation section which determines a correlation between a previously-retained specific bit sequence and an input received signal and which outputs a correlation value. Reference numeral 3305 designates a training signal generation section for generating a training signal from the correlation value output by the correlation section 3304.

Figure 31:
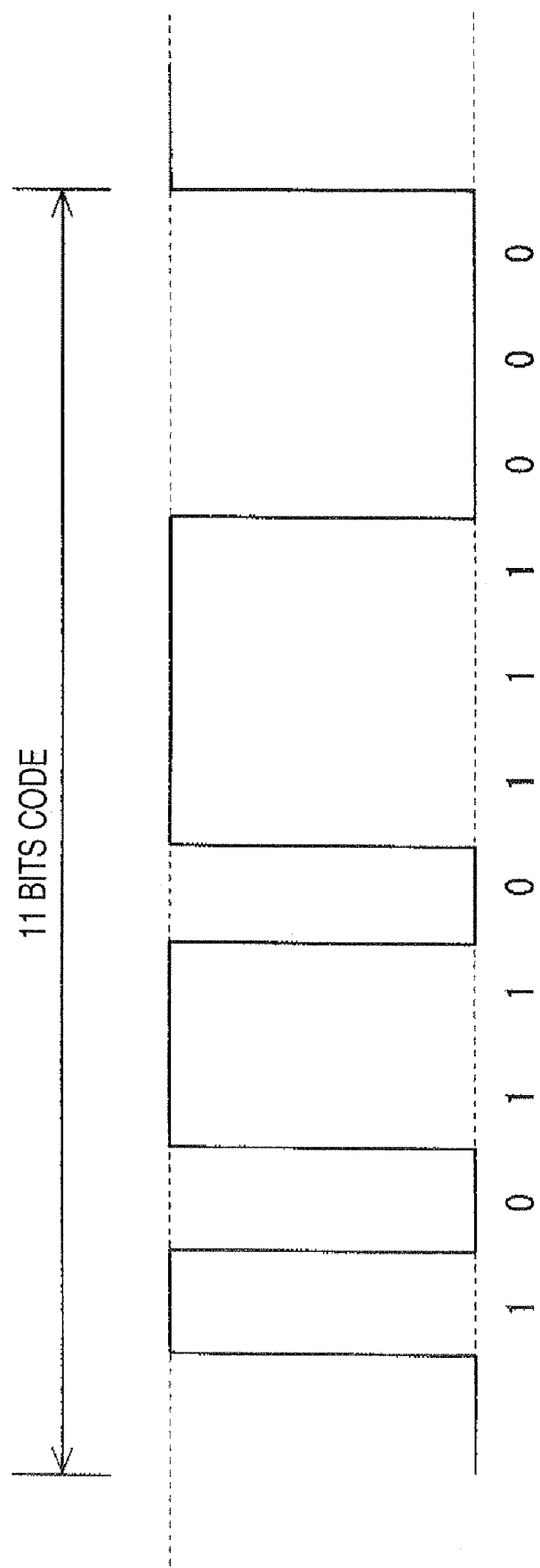
FIG. 31 is a view showing the bit configuration of a Barker code.

In this adaptive equalizer, the correlation section 3304 determines a correlation between a result of a received signal u(n) spread by a spread code being sampled every one chip period and previously-retained correlation data and which outputs a result (a correlation value). The correlation data may also be retained by the correlation section 3304 or retained by another memory (not shown) or the like. In a wireless LAN system, a Barker code is used as the correlation data. The Barker code is a code of an 11-chip fixed pattern shown in FIG. 31 and corresponds to a spread code (or a despread code) used for modulation and demodulation of a signal.

Figure 32:
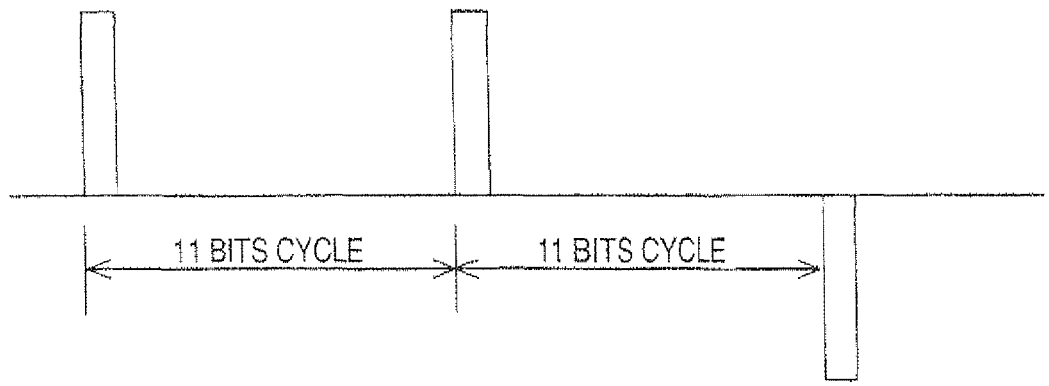
FIG. 32 is a view showing an example autocorrelation characteristic.

When the Barker code is used as correlation data, a large peak appears, every 11 bits (at an 11-chip frequency), in the correlation value output by the correlation section 3304 as shown in FIG. 32, so long as the received signal u(n) is a training signal (a spread-modulated training signal).

In accordance with the correlation value received from the correlation section 3304, the training signal generation section 3305 generates a training signal, and outputs a signal d(n). Operation for generating a training signal will be described in detail later.

The coefficient computing section 3303 computes (adjusts) a filter tap coefficient of the adaptive filter 3302 in such a way that the error signal (e(n)) between the output y(n) from the adaptive filter section 3302 and the output d(n) from the training signal generation section 3305 becomes smaller, thereby optimizing the filter tap coefficient. Processing for optimizing the filter tap coefficient is performed in a training signal receipt segment (a receiving segment of the preamble 1202 shown in FIG. 19). A common technique mentioned in connection with the previously-described related art is used for a method for optimizing a filter tap coefficient. The adaptive equalizer restores the payload 1204 (see FIG. 19) of the physical layer packet 1201 by use of the optimized filter tap coefficient.

Operation for generating a training signal will be described by reference to FIG. 33.

Figure 33:
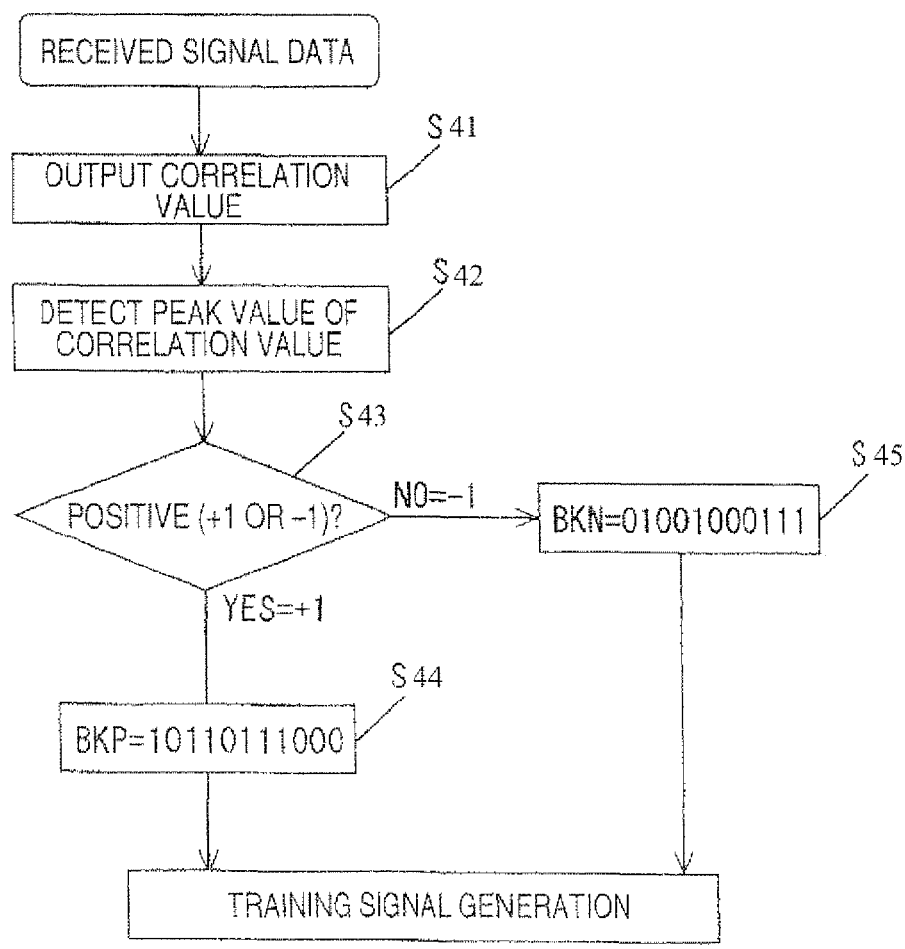
FIG. 33 is a flowchart showing example processing for generating a training signal.

FIG. 33 is a flowchart showing example processing for generating a training signal. Upon receipt of a received signal, the correlation section 3304 outputs a correlation value between the previously-retained correlation data and the input signal every one chip period (step S41).

The training signal generation section 3305 detects a peak value of the correlation value output by the correlation section 3304 (step S42), and determines whether the sign of the detected peak value is positive or negative (step S43). Next, in accordance with a result of determination as to whether the sign is positive or negative, the training signal generation section 3305 generates a training signal sequence. Specifically, the adaptive equalizer previously retains, in memory or the like, Barker code BIP (=10110111000) having an 11-bit length and data BKN (=01001000111) obtained by subjecting BKP to bit reversal. When the result of determination shows that the peak value is "+1" (Yes in step S43), the training signal generation section 305 selectively outputs BKP (step S44). Meanwhile, when the result of determination shows a peak value of "−1" (No in step S43), the training signal generation section 305 selectively outputs BKN (step S45).

BKP and BKN may be retained by the training signal generation section 3305; or they may also be retained by another memory, or the like (not shown). BKP is a result of bit reversal of BKN, and BKN is also a result of bit reversal of BKP. Hence, either one of the BKP code and the BI(N code is retained, and the training signal generation section 3305 may output a bit-reversed code as required. As a result, the amount of previously-stored information can be curtailed.

As mentioned previously, at the time of receipt of the training signal, a peak of a correlation value appears every 11 bits. Therefore, after detection of the first peak of a correlation value, the correlation value may also be output (or correlated) every 11 chip period in step S41. Thus, processing is curtailed.

Finally, a reason that a training signal can be generated by means of previously-described processing will be described. The training signal is subjected to primary modulation by use of the BPSK modulation scheme. Specifically, the training signal having undergone primary modulation is expressed as "+1" or "−1." Therefore, when the training signal having undergone primary modulation is subjected to divergence (second modulation) by means of a Barker code, a Barker code (corresponding to BKP) or a code which is a result of bit reversal of the Barker code (corresponding to BKN) is generated. Consequently, a correlation between the correlation data corresponding to the Barker code and the received signal is determined at the receiving side, thereby detecting receipt of BPK or BPN. Thus, the training signal can be generated.

As mentioned above, in the present embodiment, a training signal is generated by use of a correlation value between the previously-retained correlation data and a received signal. A filter tap coefficient of a filter which equalizes a received signal is optimized. As a result, a necessity for previously storing a training signal is obviated, and an adaptive equalizer which reduces an increase in memory size or the scale of a circuit can be implemented.

Embodiment 9

A structure of a communicating apparatus according to a ninth embodiment is the same as that shown in FIGS. 1 to 4 according to the first embodiment.

Figure 34:
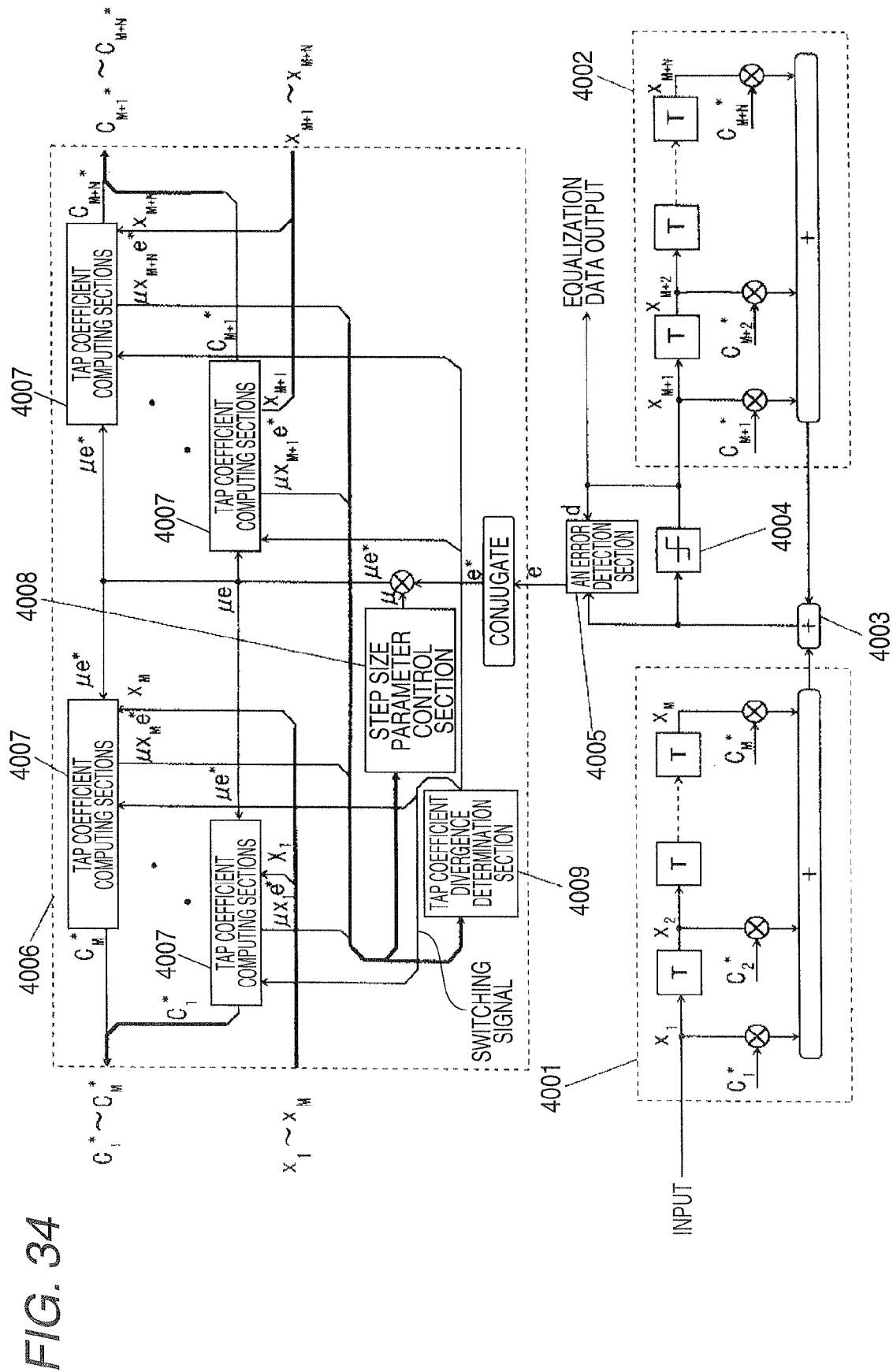
FIG. 34 is a view showing an example configuration of an adaptive equalizer of the present invention.

FIG. 34 is a view showing an example configuration of an adaptive equalizer of the present invention. In FIG. 34, reference numeral 4001 designates a transversal filter serving as a feedforward section which receives, as an input, a received signal converted into a baseband signal. Further, reference numeral 4002 designates a transversal filter serving as a feedback section. These transversal filters have tap spacing T (a symbol frequency). The number of taps assigned to the transversal filter 4001 is M (M≧2), and the number of taps assigned to the transversal filter 4002 is N (N≧1). Further, tap coefficients of the respective transversal filters can be set. Reference numeral 4003 designates an adder for adding an output from the transversal filter 4001 and an output from the transversal filter 4002; and 4004 designates a determiner which determines an output from the adder 4003 at every symbol frequency T by means of a previously-specified threshold value and which outputs a result of determination as equalized data. Reference numeral 4005 designates an error detection section (error detection means) which outputs, as an error signal "e," a difference between the output from the adder 4003 and an output from the determiner 4004 serving as a reference signal "d." Reference numeral 4006 designates a tap coefficient update section which adaptively controls respective tap coefficients in accordance with values ($x_1$, $x_2, \ldots, x_M, x_{M+1}, x_{M+2}, \ldots, x_{M+N}$) achieved at respective taps of the transversal filters 4001 and 4002 and the error signal "e" output from the error detection section 4005 (updates respective tap coefficients). Now, the tap coefficient update section 4006 updates the respective tap coefficients by use of; e.g., the previously-described LMS (Least Mean Square) algorithm.

A signal input to the adaptive equalizer of the present invention and signals of other sections may also be embodied by a complex signal formed from an in-phase component and a quadrature component obtained through quadrature detection.

Further, the tap coefficient update section 4006 has (a plurality of) tap coefficient computing sections 4007 corresponding to tap coefficient update means, a step size parameter control section 4008 corresponding to step size parameter adjustment means; and a tap coefficient divergence determination section 4009 corresponding to tap coefficient divergence determination means.

The tap coefficient computing sections 4007 are provided for respective taps. The tap coefficient computing section derives the amount of tap coefficient update from a product $\mu e^*$ consisting of a conjugate $e^*$ of the error signal "e" and a step size parameter $\mu$ and the values (any of $x_1, x_2, \ldots, x_M, x_{M+1}, x_{M+2}, \ldots, x_{M+N}$) achieved at the respective taps; and computes an update value for the tap coefficient.

The step size parameter control section 4008 receives, as an input, the amount of tap coefficient update ($\mu x_1 e^*, \ldots, \mu x_M e^*, \mu X_{M+1} e^*, \ldots, \mu X_{M+N} e^*$) from the respective tap coefficient computing sections 4007 and outputs a step size parameter $\mu$ used in operation for updating a tap coefficient. Further, the step size parameter control section 4008 sets (changes) the step size parameter $\mu$ to a value which is greater than the current preset value in connection with all of the taps when the amount of tap coefficient update has continually come to zero a previously-specified number of times (or for a previously-specified period).

The tap coefficient divergence determination section 4009 monitors the amount of tap coefficient update output from each of the tap coefficient computing sections 4007. When the absolute value of any of the amounts of tap coefficient update has continually increased a previously-specified number of times, a switching signal for a switch included in each of the tap coefficient computing sections 4007 is generated.

Figure 35:
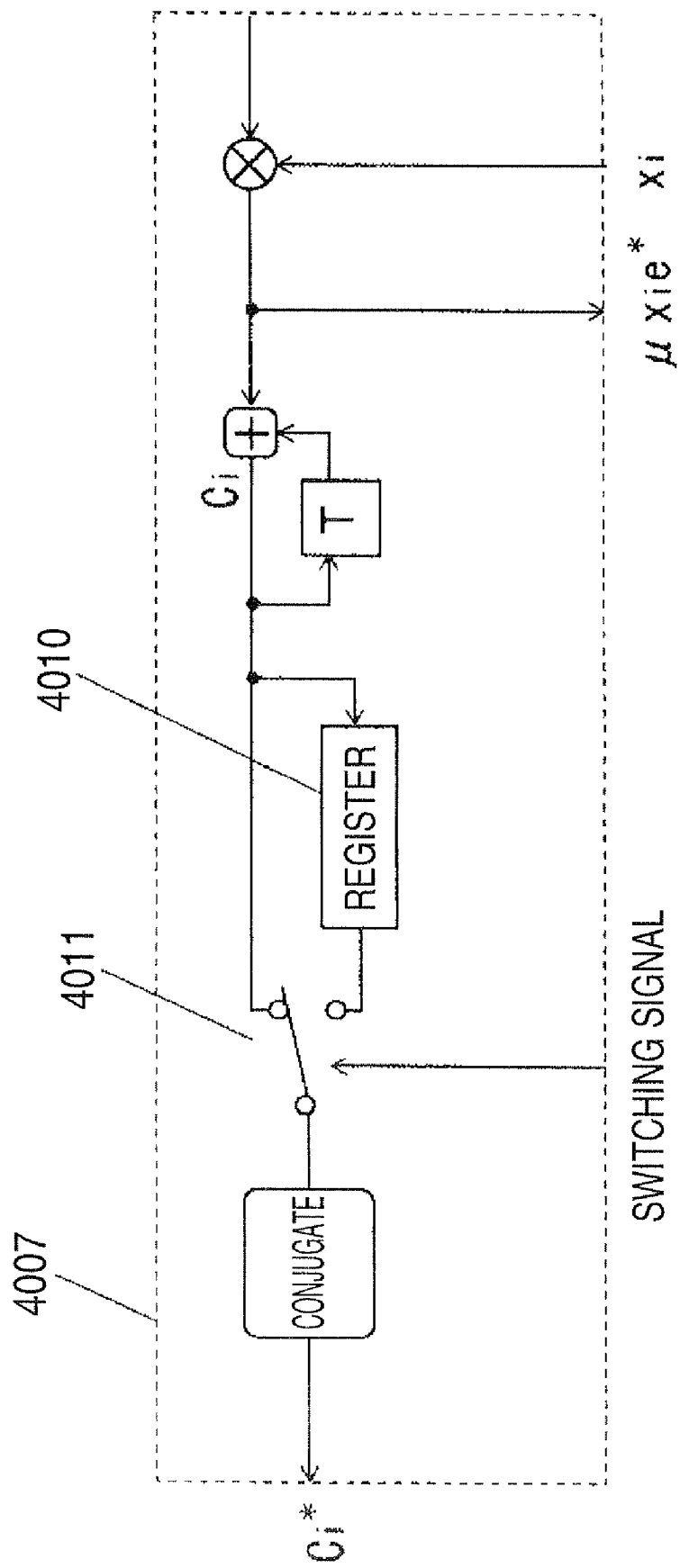
FIG. 35 is a view showing an example configuration of a tap coefficient computing section.

FIG. 35 is a view showing an example configuration of the tap coefficient computing section 4007, and the configuration includes a register 4010 and a switch 4011. This tap coefficient computing section 4007 receives, as inputs, a product $\mu e^*$ consisting of a step size parameter $\mu$ and a conjugate $e^*$ of the error signal and values xi (i=1, 2, ..., M, M+1, ..., M+N) achieved at the taps; and computes the amount of update $\mu x_i e^*$ in accordance with these values. Moreover, the tap coefficient computing section 4007 sums the tap coefficient achieved before updating of the symbol rate (T) (and the current tap coefficient), to thus compute an updated tap coefficient. Further, the tap coefficient computing section outputs a conjugate $c_i^*$ (i=1, 2, ..., M, M+1, ..., M+N) of a result of computation (an updated tap coefficient) by way of the switch 4011. When the amount of update $\mu x_i e^*$ has continually come to zero a specified number of times (hereinafter called the "number of update stop determination operations"), a tap coefficient $c_i$ achieved at that time is stored in the register 4010.

When a command from the step size parameter control section 4008 (a command for storing a tap coefficient) has been received, the tap coefficient $c_i$ acquired at that time may be stored rather than the tap coefficient $c_i$ being stored when the amount of update $\mu x_i e^*$ has continually come to zero the number of update stop determination operations. Specifically, the step size parameter control section 4008 is embodied as an adaptive equalizer capable of transmitting a command for storing a tap coefficient to the respective tap coefficient computing sections 4007. When the step size parameter $\mu$ is changed, the step size parameter control section 4008 outputs a command for storing a tap coefficient to the respective tap coefficient computing sections 4007. Upon receipt of the command for storing a tap coefficient, each of the tap coefficient computing section 4007 stores a tap coefficient achieved at that time.

At the time of commencement of updating of a tap coefficient, a switch 4011 is set to an upper side (a side where an updated tap coefficient is selected). Upon receipt of an input of a switching signal from the tap coefficient divergence determination section 4009 (see FIG. 34), the switch 4011 is switched to a lower side (a side where the tap coefficient retained by the register 4010 is read). Specifically, when the tap coefficient has become diverged, the tap coefficient computing section 4007 outputs the conjugate $c_i^*$ of the tap coefficient $c_i$ stored in the register 4010 as a conjugate of the updated tap coefficient.

Figure 36:
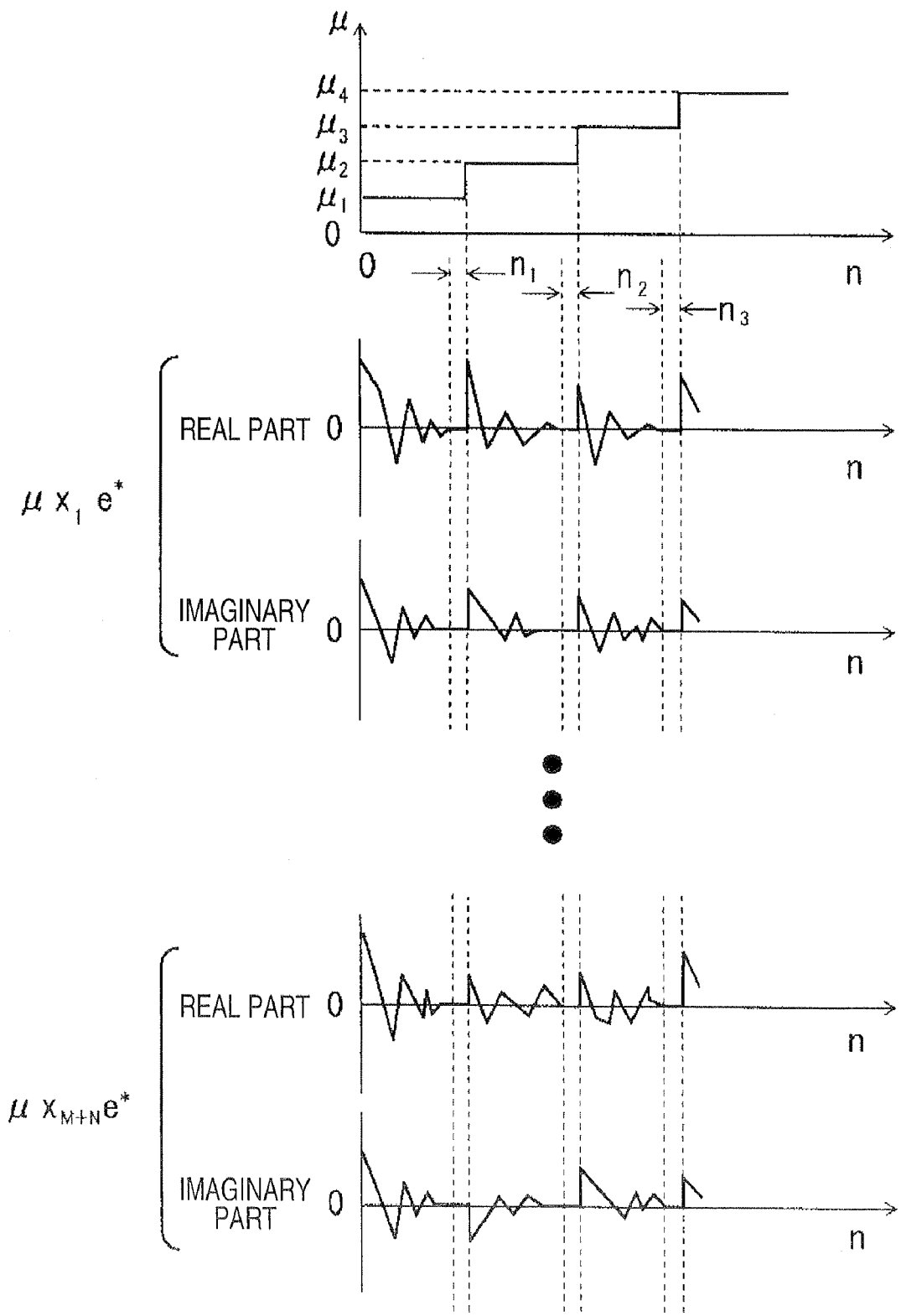
FIG. 36 is a view for schematically showing the manner of a stepwise increase in step size parameter output from a step size parameter control section in association with updating of tap coefficients.

FIG. 36 is a view schematically showing the manner of a stepwise increase in the step size parameter $\mu$ output from the step size parameter control section 4008 in association with updating of a tap coefficient. As shown in FIG. 36, a relationship of $\mu_1 < \mu_2 < \mu_3 < \mu_4$ exists among the parameters, and the minimum value $\mu_1$ achieved at the time of commencement of updating is used. Subsequently, when all of the amounts of tap coefficient updates of respective taps ($\mu x_1 e^*, \ldots, \mu x_{M+N} e^*$) have continually come to zero a predetermined number of times ($n_1$) during operation for updating tap coefficients, the step size parameter increases (is changed) to $\mu_2$. Subsequently, when all of the amounts of tap coefficient updates of the respective taps have continually come to zero a predetermined number of times $n_2$ as a result of a further progress in updating of the tap coefficients, the step size parameter increases to $\mu_3$. Likewise, when all of the amounts of tap coefficient updates of the respective taps have continually come to zero a predetermined number of times $n_3$, the step size parameter increases to $\mu_4$.

The amount of increase in step size parameter may also be made constant, or different amounts of increase in step size parameter may also be adopted. The number of times ($n_1$, $n_2$, and $n_3$) used for determining updating of the step size parameter $\mu$ does not always need to assume different values and may also assume a single value. However, the value (length) of $n_1$, that of $n_2$, and that of $n_3$ are assumed to be equal to or greater than the number of update stop determination operations used for determining whether or not the tap coefficient computing section 4007 stores the tap coefficient $c_i$ into the register 4010.

As mentioned above, when updating of the tap coefficients has stopped, the step size parameter $\mu$ increases stepwise. The reason that the step size parameter $\mu$ is increased after all of the amounts of tap coefficient updates remain zero for a predetermined period of time (a predetermined number of times) is for preventing occurrence of an erroneous increase in step size parameter $\mu$ when all of the amounts of tap coefficient updates have incidentally come to zero under the influence of noise included in a received signal.

Figure 37:
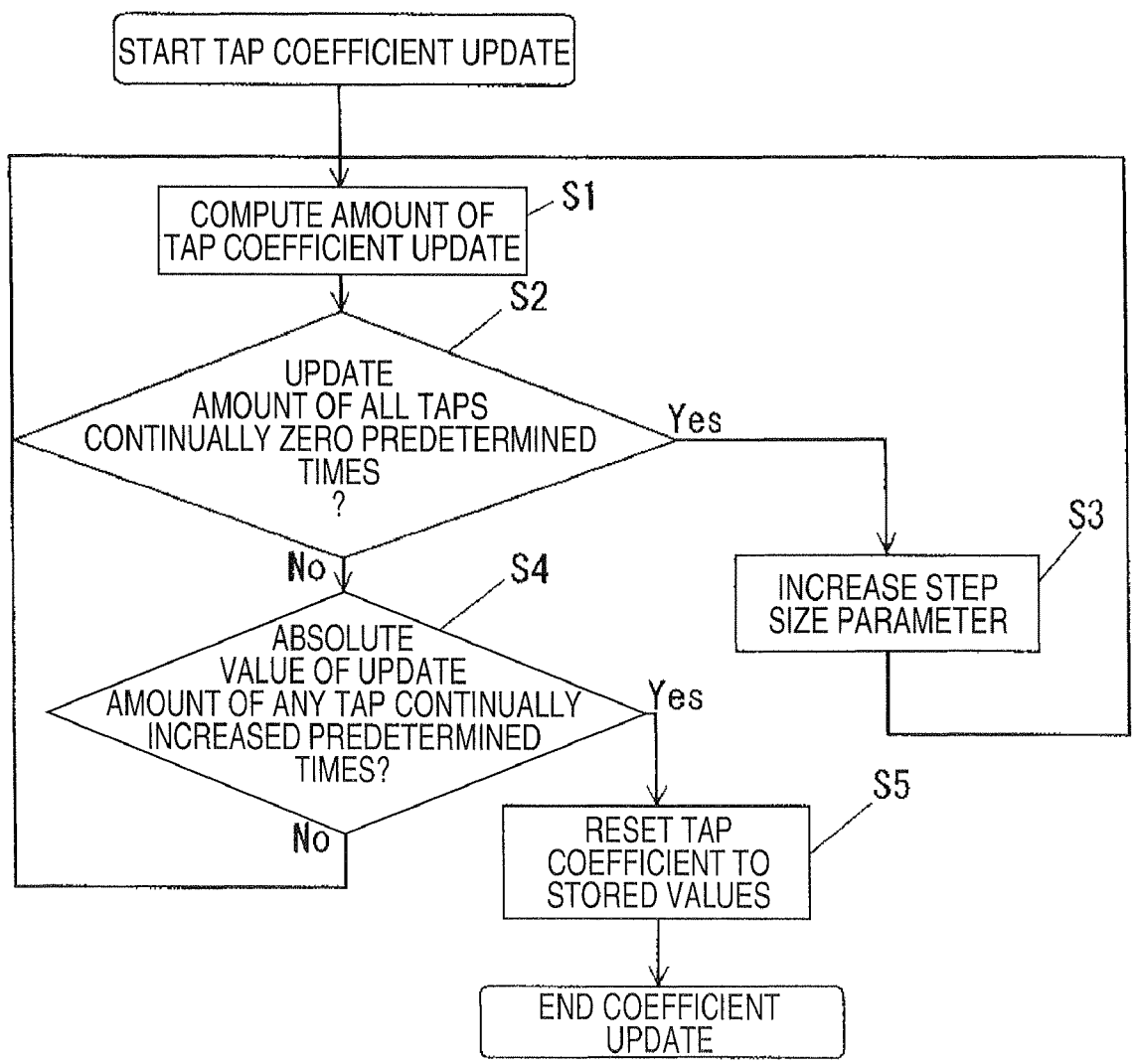
FIG. 37 is a flowchart showing an example algorithm for updating a step size parameter.

Operation of the step size parameter control section 4008 updating the step size parameter $\mu$ will be described in detail by reference to FIG. 37. FIG. 37 is a flowchart showing an example algorithm for updating the step size parameter $\mu$. After commencement of operation for updating a tap coefficient, each of the tap coefficient computing sections 4007 computes the amount of tap coefficient update, thereby updating the tap coefficient (step S1). The step size parameter control section 4008 acquires the amounts of tap coefficient updates (achieved at the respective taps) computed in step S1, thereby ascertaining whether or not all of the acquired amounts of updates have continually come to zero a predetermined number of times (step S2). When all of the amounts of updates continually have come to zero a predetermined number of times (Yes in step S2), the step size parameter $\mu$ that has been used thus far is increased (step S3). Processing returns to step S1, where the operation for updating a tap coefficient is continued.

In contrast, except when all of the amounts of updates have continually come to zero a predetermined number of times (No in step S2), the tap coefficient divergence determination section 4009 ascertains whether or not any of the absolute values of the amounts of tap coefficient updates output from the respective tap coefficient computing sections 4007 has continually increased a predetermined number of times (step S4). When any of the absolute values has continually increased a predetermined number of times (Yes in step S4), the tap coefficient divergence determination section 4009 sends each of the tap coefficient computing sections 4007 a command for resetting the tap coefficient to that stored in the register 10 (step S5). Specifically, a signal for switching the switch 4011 is output to each of the tap coefficient computing sections 4007. Meanwhile, except when any of the absolute values has continually increased a predetermined number of times (No in step S4), processing returns to step S1, wherein operation for updating the tap coefficient is continued. When processing pertaining to step S5 is performed, the tap coefficient update operation is terminated. Tap coefficients achieved at that time are taken as final tap coefficients (sufficiently-updated tap coefficients).

Subsequently, operation of the adaptive equalizer having the above-described configuration will be described in detail. The step size parameter $\mu$ achieved when updating of tap coefficients is commenced is set to $\mu_1$ (see FIG. 36). As mentioned previously, each of the tap coefficient computing sections 4007 computes a tap coefficient from the product $\mu e^*$ consisting of the conjugate $e^*$ of the error signal "e" and the step size parameter $\mu$ and values achieved at the respective taps. The respective tap coefficient computing sections 4007 repeats operation for computing the tap coefficients such that the amplitude of the error signal "e" becomes smaller, thereby consecutively updating the tap coefficients.

The step size parameter control section 4008 monitors the amount of tap coefficient update ($\mu x_i e^*$, i=1, 2, ..., M, M+1, ..., M+N) output from the respective tap coefficient computing sections 4007. As shown in FIG. 36, when the amounts of tap coefficient updates $\mu x_i e^*$ pertaining to all of the taps are determined to have continually come to zero a predetermined number of times ($n_1$) and when updating of the tap coefficients are determined to have stopped, the step size parameter is switched from $\mu_1$ to $\mu_2$ (is changed to a larger value), whereby the tap coefficients are updated. When updating of the tap coefficients has proceeded further and the amplitude of the error signal "e" has become smaller, the amounts of tap coefficient updates $\mu x_i e^*$ pertaining to all of the taps continually come to zero a predetermined number of times ($n_2$). In that case, the step size parameter is switched from $\mu 2$ to $\mu 3$. The step size parameter control section 4008 and the respective tap coefficient computing sections 4007 repeatedly perform such processing, whereby the tap coefficients of the respective taps are updated sufficiently. In FIG. 36, a real part and an imaginary part of the amount of tap coefficient update are monitored in connection with all of the taps. However, in view of constraints on the scale of a circuit, there may also be adopted a configuration for monitoring only a real part of the amount of tap coefficient update or monitoring only the amount of tap coefficient update of the transversal filter 4002.

However, when the step size parameter has become excessively large, updating (convergence) of the tap coefficients is stopped, and divergence of the tap coefficients conversely starts, thus raising a problem. For this reason, the tap coefficient divergence determination section 4009 monitors the amounts of tap coefficient updates output from the respective tap coefficient computing sections 4007. When the monitoring result shows that the absolute values of the amounts of tap coefficient updates pertaining to any of the taps have continually increased a predetermined number of times, the tap coefficients are determined to have started divergence, and the switching signal is output. Specifically, the switch 4011 in each of the tap coefficient computing sections 4007 is switched toward the register 4010. Since the tap coefficients whose convergence has proceeded before updating of the step size parameter $\mu$ (the amounts of updates of these tap coefficients have come to zero) are stored in the register 4010, each of the tap coefficients can be returned to a value achieved before divergence.

As mentioned above, in the present embodiment, the amounts of tap coefficient updates pertaining to the respective taps are monitored by means of operation for updating tap coefficients of the respective taps in the transversal filter. When all of the amounts of updates have continually come to zero a predetermined number of times (updating operation has stopped), a step size parameter is changed to a greater value, thereby causing updating operation to proceed. Meanwhile, when any of (the absolute values of) the amounts of updates have continually increased a predetermined number of times (divergence of the tap coefficients has started), the tap coefficients are returned to those achieved before initiation of divergence, and updating operation is terminated. Thus, even in the adaptive equalizer formed from a digital circuit having finite bit widths for the tap coefficients, tap coefficients sufficiently updated in accordance with the bit widths of the tap coefficients can be acquired.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The invention claimed is:

1. A synchronous detection circuit comprising:
   an interpolation circuit for regulating an interpolation calculation coefficient based on phase shift information when carrying out an interpolation calculation processing over a received signal which is digitally converted;
   a sampling circuit for sampling interpolation data output from the interpolation circuit by using a recovered clock to be a reference and two clocks having phases corresponding to one processing clock which are advanced and delayed for the recovered clock;
   a phase shift detecting circuit for monitoring a shift of a phase by using three sampling data output from the sampling circuit and outputting phase shift information to the interpolation circuit when detecting a predetermined phase shift; and
   a demodulating circuit for carrying out a demodulation processing by using the data subjected to the sampling with the recovered clock output from the sampling circuit.

2. The synchronous detection circuit according to claim 1, wherein the phase shift detecting circuit generates and outputs the phase shift information when a phase shift amount which is detected exceeds a predetermined phase shift amount.

3. The synchronous detection circuit according to claim 1, wherein the phase shift detecting circuit generates and outputs the phase shift information based on the detected phase shift amount at any time.

4. The synchronous detection circuit according to claim 1, wherein the interpolation circuit selects a coefficient to be used for an interpolation calculation to be executed for the phase shift information from preset values.

5. The synchronous detection circuit according to claim 1, wherein the interpolation circuit calculates a coefficient to be used for an interpolation calculation to be executed for the phase shift information corresponding to a phase shift amount at any time.

6. The synchronous detection circuit according to claim 1, wherein there is provided a band limiting filter for carrying out a band limitation processing before inputting a receiving signal to the interpolation circuit.

7. The synchronous detection circuit according to claim 1, wherein a jitter removing filter for removing a jitter is provided between the phase shift detecting circuit and the interpolation circuit.

8. A wireless controller comprising the synchronous detection circuit according to claim 1.

9. A wireless communicating apparatus comprising the synchronous detection circuit according to claim 1.

10. A synchronous detection circuit comprising:
    an interpolation circuit for performing an interpolation processing over at least three sampling data and generating a plurality of interpolation output data;
    a sampling circuit for detecting a relationship of amplitudes of the plurality of interpolation output data;
    a phase shift detecting circuit for outputting a sampling timing of the interpolation output data having the largest amplitude among the plurality of interpolation output data;
    a demodulation circuit for demodulating the interpolation output data having the largest amplitude,
    wherein said interpolation circuit generates the plurality of interpolation output data using a sampling timing close to the sampling timing of the interpolation output data having the largest amplitude.

* * * * *